United States Patent
Binette et al.

(10) Patent No.: US 6,413,170 B1
(45) Date of Patent: *Jul. 2, 2002

(54) GOLF BALL

(75) Inventors: Mark L. Binette, Ludlow; Thomas J. Kennedy, III, Wilbraham; R. Dennis Nesbitt, Westfield, all of MA (US); Michael J. Sullivan, Barrington, RI (US)

(73) Assignee: Spalding Sports Worldwide, Inc., Chicopee, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/490,167

(22) Filed: Jan. 22, 2000

Related U.S. Application Data

(60) Continuation-in-part of application No. 09/093,447, filed on Jun. 8, 1998, which is a division of application No. 08/782,221, filed on Jan. 13, 1997, now Pat. No. 6,015,356.
(60) Provisional application No. 60/116,846, filed on Jan. 22, 1999, provisional application No. 60/116,870, filed on Jan. 22, 1999, and provisional application No. 60/117,328, filed on Jan. 22, 1999.

(51) Int. Cl.[7] ............................................. A63B 37/06
(52) U.S. Cl. ....................................................... 473/377
(58) Field of Search ................................. 473/371, 372, 473/377, 378, 376

(56) References Cited

U.S. PATENT DOCUMENTS

| | | |
|---|---|---|
| 1,482,232 A | 1/1924 | Hazeltine |
| 1,795,732 A | 3/1931 | Miller |
| 2,050,402 A | 8/1936 | Walsh .......................... 273/62 |
| 2,861,810 A | 11/1958 | Veatch ......................... 273/213 |
| 3,865,369 A | 2/1975 | Randolph ................... 273/63 E |
| 4,264,071 A | 4/1981 | Randolph ..................... 273/63 |
| 4,625,964 A | 12/1986 | Yamada ......................... 273/62 |
| 4,650,193 A | 3/1987 | Molitor et al. ............... 273/228 |
| 4,683,257 A | * 7/1987 | Kakiuchi et al. ............ 525/432 |
| 4,863,167 A | 9/1989 | Matsuki et al. ................ 273/62 |
| 4,984,804 A | * 1/1991 | Yamada et al. .............. 473/378 |
| 5,026,067 A | 6/1991 | Gentiluomo ................. 273/220 |
| 5,048,838 A | 9/1991 | Chikaraishi et al. ......... 473/374 |
| 5,215,304 A | 6/1993 | Pinel, Jr. et al. .............. 273/63 |
| 5,273,285 A | 12/1993 | Sun .............................. 273/228 |
| 5,427,378 A | 6/1995 | Murphy ....................... 273/235 |
| 5,439,227 A | 8/1995 | Egushira et al. ............. 473/374 |
| 5,662,534 A | 9/1997 | Kroll et al. ................... 473/353 |
| 5,730,664 A | * 3/1998 | Asakura et al. .............. 473/373 |

FOREIGN PATENT DOCUMENTS

EP          600 721 A1       6/1994

* cited by examiner

*Primary Examiner*—Mark S. Graham
*Assistant Examiner*—Raeann Gordon

(57) ABSTRACT

The present invention is directed to improved multi-layer golf ball compositions and the resulting regulation balls produced using these compositions. In this regard, a smaller and lighter core is produced and metal particles, or other heavy weight filler materials, are included in the cover compositions. This results in a molded golf ball exhibiting enhanced interior perimeter weighting. Preferably, the particles are included in a relatively thick inner cover layer (or mantle) of a solid, three-piece multi-layered golf ball. The size and weight of the core is reduced in order to produce an overall golf ball which meets, or is less than, the 1.62 ounce maximum weight limitation specified by the United States Golf Association. It has been found that the combination of the present invention produces a golf ball with an increased moment of inertia and/or a greater radius of gyration and thus generates lower spin. This results in a golf ball exhibiting enhanced distance without substantially effecting the feel and durability characteristics of the ball.

20 Claims, 1 Drawing Sheet

GOLF BALL

This application claims the benefit of the filing date of U.S. Provisional Applications: 60/116,846, filed Jan. 22, 1999; 60/117,328, filed Jan. 22, 1999; and 60/116,870, filed Jan. 22, 1999. In addition, this application is a continuation-in-part application of U.S. application Ser. No. 09/093,447, filed Jun. 9, 1998, pending, which is a divisional of U.S. application Ser. No. 08/782,221, filed Jan. 12, 1997 U.S. Pat. No. 6,018,356.

FIELD OF THE INVENTION

The present invention pertains to the construction of regulation golf balls including golf balls having enhanced distance and feel characteristics. More particularly, the invention relates to improved multi-layer golf balls having one or more cover layers containing metal particles or other heavy weight filler materials to enhance the interior perimeter weight of the balls. Preferably, the heavy weight filler particles are present in a thicker inner cover layer. The inclusion of the particles along with the production of a smaller core produces a greater (or higher) moment of inertia. This results in less spin, reduced slicing and hooking and further distance. Additionally, the golf balls of the invention have essentially the same "feel" characteristic of softer balata covered balls.

BACKGROUND OF THE INVENTION

Golf balls utilized in tournament or competitive play today are regulated for consistency purposes by the United States Golf Association (U.S.G.A.). In this regard, there are five (5) U.S.G.A. specifications which golf balls must meet under controlled conditions. These are size, weight, velocity, driver distance and symmetry.

Under the U.S.G.A. specifications, a golf ball can not weigh more than 1.62 ounces (with no lower limit) and must measure at least 1.68 inches (with no upper limit) in diameter. However, as a result of the openness of the upper or lower parameters in size and weight, a variety of golf balls can be made. For example, golf balls are manufactured today which by the Applicant are slightly larger (i.e., approximately 1.72 inches in diameter) while meeting the weight, velocity, distance and symmetry specifications set by the U.S.G.A.

Additionally, according to the U.S.G.A., the initial velocity of the ball must not exceed 250 ft/sec. with a 2% maximum tolerance (i.e., 255 ft/sec.) when struck at a set club head speed on a U.S.G.A. machine. Furthermore, the overall distance of the ball must not exceed 280 yards with a 6% tolerance (296.8 yards) when hit with a U.S.G.A. specified driver at 160 ft/sec. (clubhead speed) at a 10 degree launch angle as tested by the U.S.G.A. Lastly, the ball must pass the U.S.G.A. administered symmetry test, i.e., fly consistency (in distance, trajectory and time of flight) regardless of how the ball is placed on the tee.

While the U.S.G.A. regulates five (5) specifications for the purposes of maintaining golf ball consistency, alternative characteristics (i.e., spin, feel, durability, distance, sound, visability, etc.) of the ball are constantly being improved upon by golf ball manufacturers. This is accomplished by altering the type of materials utilized and/or improving construction of the balls. For example, the proper choice of cover and core materials are important in achieving certain distance, durability and playability properties. Other important factors controlling golf ball performance include, but are not limited to, cover thickness and hardness, core stiffness (typically measured as compression), ball size and surface configuration.

As a result, a wide variety of golf balls have been designed and are available to suit an individual player's game. Moreover, improved golf balls are continually being produced by golf ball manufacturers with technologized advancements in materials and manufacturing processes.

Two of the principal properties involved in a golf ball's performance are resilience and compression. Resilience is generally defined as the ability of a strained body, by virtue of high yield strength and low elastic modulus, to recover its size and form following deformation. Simply stated, resilience is a measure of energy retained to the energy lost when the ball is impacted with the club.

In the field of golf ball production, resilience is determined by the coefficient of restitution (C.O.R.), the constant "e" which is the ratio of the relative velocity of an elastic sphere after direct impact to that before impact. As a result, the coefficient of restitution ("e") can vary from 0 to 1, with 1 being equivalent to a perfectly or completely elastic collision and 0 being equivalent to a perfectly or completely inelastic collision.

Resilience (C.O.R.), along with additional factors such as club head speed, club head mass, angle of trajectory, ball size, density, composition and surface configuration (i.e., dimple pattern and area of coverage) as well as environmental conditions (i.e., temperature, moisture, atmospheric pressure, wind, etc.) generally determine the distance a golf ball will travel when hit. Along this line, the distance a golf ball will travel under controlled environmental conditions is a function of the speed and mass of the club and the size, density, composition and resilience (C.O.R.) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (C.O.R.), spin and the surface configuration (dimple pattern, ratio of land area to dimple area, etc.) of the ball.

The coefficient of restitution (C.O.R.) in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, center and cover of a wound core ball may also consist of one or more layers.

The coefficient of restitution of a golf ball can be analyzed by determining the ratio of the outgoing velocity to the incoming velocity. In the examples of this writing, the coefficient of restitution of a golf ball was measured by propelling a ball horizontally at a speed of 125+/−1 feet per second (fps) against a generally vertical, hard, flat steel plate and measuring the ball's incoming and outgoing velocity electronically. Speeds were measured with a pair of Oehler Mark 55 ballistic screens (available from Oehler Research Austin Tex.), which provide a timing pulse when an object passes through them. The screens are separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it.

As indicated above, the incoming speed should be 125+/−1 fps. Furthermore, the correlation between C.O.R. and forward or incoming speed has been studied and a correction has been made over the +/− fps range so that the C.O.R. is reported as if the ball had an incoming speed of exactly 125.0 fps.

The coefficient of restitution must be carefully controlled in all commercial golf balls if the ball is to be within the specifications regulated by the U.S.G.A. As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution (C.O.R.) to closely approach the U.S.G.A. limit on initial velocity, while having an ample amount of softness (i.e., hardness) to produce the desired degree of playability (i.e., spin, etc.).

Furthermore, the maximum distance a golf ball can travel (carry and roll) when tested on a U.S.G.A. driving machine set at a club head speed of 160 feet/second is 296.8 yards. While golf ball manufacturers design golf balls which closely approach this driver distance specification, there is no upper limit for how far an individual player can drive a ball. Thus, while golf ball manufacturers produced balls having certain resilience characteristics in order to approach the maximum distance parameter set by the U.S.G.A. under controlled conditions, the overall distance produced by a ball in actual play will vary depending on the specific abilities of the individual golfer.

The surface configuration of a ball is also an important variable in affecting a ball's travel distance. The size and shape of the ball's dimples, as well as the overall dimple pattern and ratio of land area to dimpled area are important with respect to the ball's overall carrying distance. In this regard, the dimples provide the lift and decrease the drag for sustaining the ball's initial velocity in flight as long as possible. This is done by displacing the air (i.e., displacing the air resistance produced by the ball from the front of the ball to the rear) in a uniform manner. The shape, size, depth and pattern of the dimple affect the ability to sustain a ball's initial velocity differently.

As indicated above, compression is another property involved in the overall performance of a golf ball. The compression of a ball will influence the sound or "click" produced when the ball is properly hit. Similarly, compression can effect the "feel" of the ball (i.e., hard or soft responsive feel), particularly in chipping and putting.

Moreover, while compression of itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multilayer solid core balls exhibit much more consistent compression readings than balls having wound cores such as the thread wound three-piece balls.

Additionally, cover hardness and thickness are important in producing the distance, playability and durability properties of a golf ball. As mentioned above, cover hardness directly affects the resilience and thus distance characteristics of a ball. All things being equal, harder covers produce higher resilience. This is because soft materials detract from resilience by absorbing some of the impact energy as the material is compressed on striking.

Furthermore, soft covered balls are preferred by the more skilled golfer because he or she can impact high spin rates that give him or her better control or workability of the ball. Spin rate is an important golf ball characteristic for both the skilled and unskilled golfer. As just mentioned, high spin rates allow for the more skilled golfer, such as PGA and LPGA professionals and low handicap players, to maximize control of the golf ball. This is particularly beneficial to the more skilled golfer when hitting an approach shot to a green. The ability to intentionally produce "back spin", thereby stopping the ball quickly on the green, and/or "side spin" to draw or fade the ball, substantially improves the golfer's control over the ball. Thus, the more skilled golfer generally prefers a golf ball exhibiting high spin rate properties.

However, a high spin golf ball is not desirous by all golfers, particularly high handicap players who cannot intentionally control the spin of the ball. Additionally, since a high spinning ball will roll substantially less than a low spinning golf balls, a high spinning ball is generally short on distance.

In this regard, less skilled golfers, have, among others, two substantial obstacles to improving their game: slicing and hooking. When a club head meets a ball, an unintentional side spin is often imparted which sends the ball off its intended course. The side spin reduces one's control over the ball as well as the distance the ball will travel. As a result, unwanted strokes are added to the game.

Consequently, while the more skilled golfer frequently desires a high spin golf ball, a more efficient ball for the less skilled player is a golf ball that exhibits low spin properties. The low spin ball reduces slicing and hooking and enhances distance. Furthermore since a high spinning ball is generally short on distance, such a ball is not universally desired by even the more skilled golfer.

With respect to high spinning balls, up to approximately twenty years ago, most high spinning balls were comprised of balata or blends of balata with elastomeric or plastic materials. The traditional balata covers are relatively soft and flexible. Upon impact, the soft balata covers compress against the surface of the club producing high spin. Consequently, the soft and flexible balata covers provide an experienced golfer with the ability to apply a spin to control the ball in flight in order to produce a draw or a fade, or a backspin which causes the ball to "bite" or stop abruptly on contact with the green.

Moreover, the soft balata covers produce a soft "feel" to the low handicap player. Such playability properties (workability, feel, etc.) are particularly important in short iron play with low swing speeds and are exploited significantly by relatively skilled players.

However, despite all the benefits of balata, balata covered golf balls are easily cut and/or damaged if mis-hit. Golf balls produced with balata or balata-containing cover compositions therefore have a relatively short lifespan.

Additionally, soft balata covered balls are shorter in distance. While the softer materials will produce additional spin, this is frequently produced at the expense of the initial velocity of the ball. Moreover, as mentioned above, higher spinning balls tend to roll less.

As a result of these negative properties, balata and its synthetic substitutes, transpolyisoprene and transpolybutadiene, have been essentially replaced as the cover materials of choice by new synthetic materials. Included in this group of materials are ionomer resins.

Ionomeric resins are polymers in which the molecular chains are cross-linked by ionic bonds. As a result of their toughness, durability and flight characteristics, various ionomeric resins sold by E. I. DuPont de Nemours & Company under the trademark "Surlyn®" and more recently, by the Exxon Corporation (see U.S. Pat. No. 4,911,451) under the trademarks "Escor®" and the trade name "Iotek", have become the materials of choice for the construction of golf ball covers over the traditional "balata" (transpolyisoprene, natural or synthetic) rubbers. As stated, the softer balata covers, although exhibiting enhanced playability properties, lack the durability (cut and abrasion resistance, fatigue endurance, etc.) properties required for repetitive play and are limited in distance.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata.

Historically, some of the advantages produced by ionomer resins gained in increased durability were offset to some degree by decreases produced in playability. This was because although the ionomeric resins were very durable, they initially tended to be very hard when utilized for golf ball cover construction, and thus lacked the degree of softness required to impart the spin necessary to control the ball in flight. Since the initial ionomeric resins were harder than balata, the ionomeric resin covers did not compress as much against the face of the club upon impact, thereby producing less spin.

In addition, the initial, harder and more durable ionomeric resins lacked the "feel" characteristic associated with the softer balata related covers. The ionomer resins tended to produce a hard responsive "feel" when struck with a golf club such as a wood, iron, wedge or putter.

As a result of these difficulties and others, a great deal of research has been and is currently being conducted by golf ball manufacturers in the field of ionomer resin technology. There are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc. However, a great deal of research continues in order to develop golf ball cover compositions exhibiting not only the improved impact resistance and carrying distance properties produced by the "hard" ionomeric resins, but also the playability (i.e., "spin", "feel", etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced by the Applicant and others to address these needs. The different types of materials utilized to formulate the cores, covers, etc. of these balls dramatically alters the balls' overall characteristics.

In addition, multi-layered covers containing one or more ionomer resins have also been formulated in an attempt to produce a golf ball having the overall distance, playability and durability characteristics desired. For example, this was addressed by Spalding & Evenflo Companies, Inc., the assignee of the present invention, in U.S. Pat. No. 4,431,193 where the construction of a multi-layered golf ball having two ionomer resin cover layers is disclosed.

In the examples of the '193 patent, a multi-layer golf ball is produced by initially molding a first cover layer on a solid spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi. The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides essentially no gain in the coefficient of restitution but provides for the advantageous "feel" and playing characteristics of a balata covered golf ball. Unfortunately, however, while the ball of the examples of the '193 patent do exhibit enhanced playability characteristics with improved distance (i.e. enhanced C.O.R. values) over a number of other then known multi-layered balls, the balls suffer from relatively short distance (i.e. lower C.O.R. values) when compared to two-piece, single cover layer balls commercially available today. These undesirable properties make the balls produced in accordance with the limited examples of the '193 patent generally unacceptable by today's standards.

The present invention is directed to new multi-layer golf ball compositions which provide for enhanced coefficient of restitution (i.e, improved travel distance) and/or durability properties when compared to the multi-layer balls found in the examples of the prior art. The travel distance of the balls of the invention is further improved by the balls increased moment of inertia and reduced overall spin rate.

Moreover, the balls of the invention have enhanced outer cover layer softness and feel. The improvements in distance, feel, etc. are produced without substantial sacrifices in controllability resulting from the loss of spin produced by the balls increased moment of inertia.

These and other objects and features of the invention will be apparent from the following summary and description of the invention, the drawings and from the claims.

SUMMARY OF THE INVENTION

The present invention is directed to improved multi-layer golf ball compositions and the resulting regulation balls produced using those compositions. In this regard, a smaller and lighter core is produced and metal particles, or other heavy weight filler materials, are included in the cover compositions. This results in a molded golf exhibiting enhanced interior perimeter weighting. Preferably, the particles are included in a relatively thick inner cover layer (or mantle) of a solid, three-piece multi-layered golf ball. The size and weight of the core is reduced in order to produce an overall golf ball which meets, or is less than, the 1.62 ounce maximum weight limitation specified by the United States Golf Association.

It has been found that the combination of the present invention produces a golf ball with an increased moment of inertia and/or a greater radius of gyration and thus generates lower initial spin. This results in a golf ball exhibiting enhanced distance without substantially effecting the feel and durability characteristics of the ball.

Preferably, the multi-layer golf ball covers of the present invention include a first or inner layer or ply of a hard, high modulus material (i.e., flexural modulus of 15,000, or greater psi (ASTM D-790) and a hardness of at least 60 (more desirably 65 or more on the Shore D scale (ASTM D-2240)) such as a blend of one or more hard (high or low acid) ionomer resins. Additionally, included in the multi-layer golf balls is a second or outer layer or ply comprised of a comparatively softer, low modulus material (i.e., flexural modulus of 1,000 to 10,000 psi (ASTM D-790) and Shore D hardness of 65 or less, more desirably 60 or less). Examples of such materials include a blend of one or more soft ionomer resins or other non-ionomeric thermoplastic or thermosetting elastomer such as polyurethane or polyester elastomer. Metal particles and other heavy weight filler materials (from 1–100 parts per hundred resin (phr), preferably 4 to 51 phr, and most preferably 10 to 25 phr) are included in the first or inner cover layer in order to enhance the moment of inertia of the golf ball. The multi-layer golf balls of the invention can be of standard or enlarged size.

More preferably, the inner layer or ply of the golf ball of the invention includes a blend of high acid ionomer resins (greater than 16 weight percent acid) or a blend of high modulus low acid ionomers and has a Shore D hardness of 65 or greater. Various amounts of metallic particles or other heavy weight filler materials are included in the inner cover layer and the size and weight of the core is reduced in order to produce selective variations in the moment of inertia of the ball. The outer cover layer preferably comprises a blend of low modulus ionomer resins or is comprised of polyurethane and has a Shore D hardness of about 45 to 55 (i.e., Shore C hardness of about 65 to 75).

In this regard, it has been found that multi-layer golf balls can be produced having inner and outer cover layers which exhibit improved C.O.R. values and have greater travel distance in comparison with balls made from a single cover layer. In addition, it has been found that use of a softer outer layer adds to the desirable "feel" and a higher spin rate while maintaining respectable resiliency. The soft outer layer allows the cover to deform more during impact and increases the area of contact between the club face and the cover, thereby imparting additional spin on the ball. As a result, the soft cover provides a multi-layer ball with a balata-like feel and spin characteristics with improved distance and durability.

It has now been determined that the travel distance of such multi-layer golf balls can be further improved without substantially sacrificing the feel and durability characteristics of the ball through the inclusion of metal particles or other heavy metal filler materials in the inner cover compositions. The metal particles or fragments increase the weight of the interior perimeter of a golf ball in comparison to the central core. Further, the core is also made smaller and lighter in order to conform with the weight requirements of the U.S.G.A. This combination of weight displacement increases the moment of inertia and/or moves the radius of gyration of the ball closer to the outer surface of the ball.

Consequently, selective adjustments in weight arrangement will produce different moments of inertia and/or radii of gyration. The overall result is the production of a lower initial spinning multi-layer golf ball which travels farther while maintaining the feel and durability characteristics desired by a golf ball utilized in regulation play.

The moment of inertia of a golf ball (also known as rotational inertia) is the sum of the products formed by multiplying the mass (or sometimes the area) of each element of a figure by the square of its distance from a specified line such as the center of a golf ball. This property is directly related to the radius of gyration of a golf ball which is the square root of the ratio of the moment of inertia of a golf ball about a given axis to its mass. It has been found that the greater the moment of inertia (or the farther the radius of gyration is to the center of the ball) the lower the spin rate is of the ball.

The present invention is directed, in part, to increasing the moment of inertia of a multi-layered golf ball by varying the weight arrangement of the cover (preferably to inner cover layer) and the core components. By varying the weight, size and density of the components of the golf ball, the moment of inertia of a golf ball can be increased. Such a change can occur in a multi-layered golf ball, including a ball containing one or more cover layers, to enhance distance due to the production of less side spin and improved roll.

Accordingly, the present invention is directed to an improved multi-layer cover which produces, upon molding each layer around a core (preferably a smaller and lighter solid core) to formulate a multi-layer cover, a golf ball exhibiting enhanced distance (i.e., improved resilience, less side spin, improved roll) without adversely affecting, and in many instances, improving the ball's feel (hardness/softness) and/or durability (i.e., cut resistance, fatigue resistance, etc.) characteristics.

These and other objects and features of the invention will be apparent from the following detailed description.

DETAILED DESCRIPTION OF THE INVENTION

Figure 1:
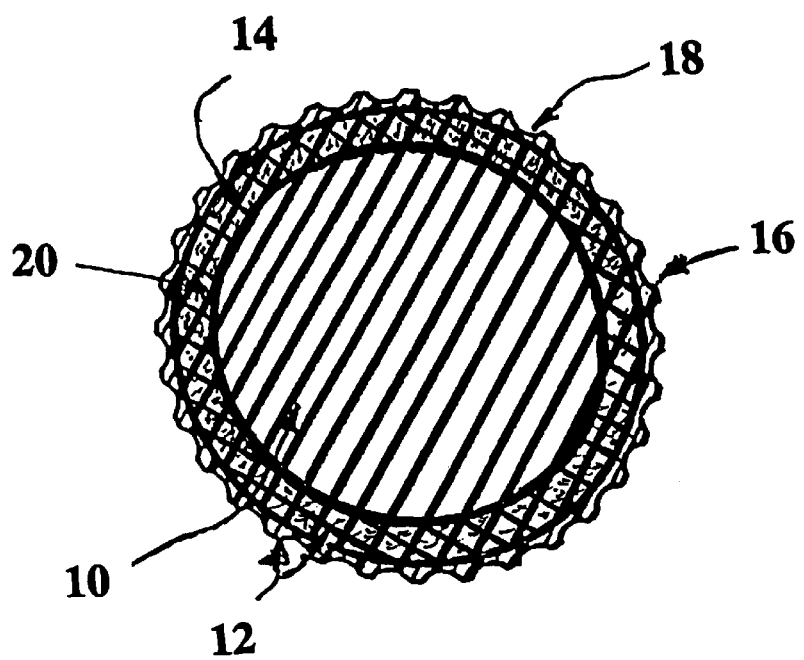
FIG. 1 is a cross-sectional view of a golf ball embodying the invention illustrating a core 10 and a multi-layer cover 12 consisting of an inner layer 14 containing metal particles or other heavy filler materials 20 and an outer layer 16 having dimples 18.
Figure 2:
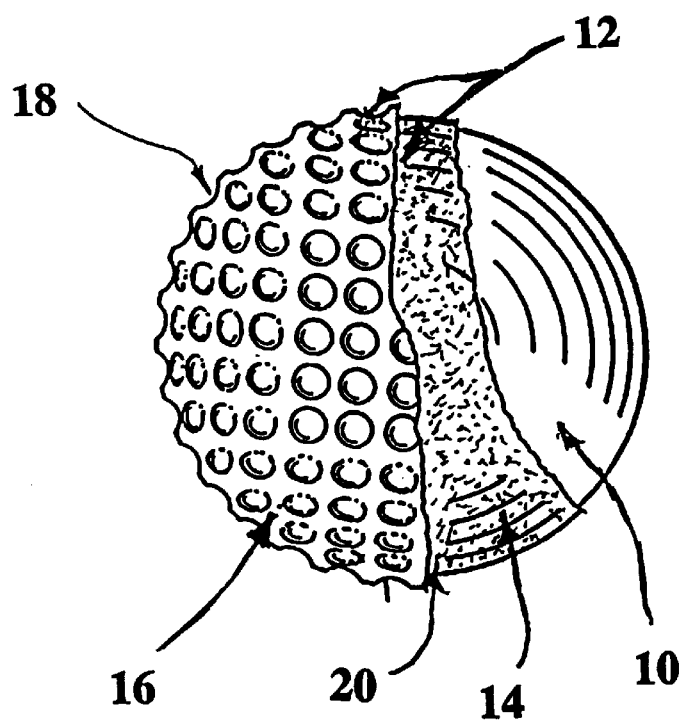
FIG. 2 is a diametrical cross-sectional view of a golf ball of the invention having a core 10 and a cover 12 made of an inner layer 14 containing metal particles or other fragments 20 and an outer layer 16 having dimple 18.

The present invention relates to improved multi-layer golf balls, particularly a golf ball comprising a multi-layered cover 12 over a core 10, and method for making same. Preferably core 10 is a solid core, although a wound core having the desired characteristics can also be used.

The multi-layered cover 12 comprises two layers: a first or inner layer or ply 14 and a second or outer layer or ply 16. The inner layer 14 is comprised of a hard, high modulus (flexular modulus of 15,000 to 150,000), low or high acid (i.e. greater than 16 weight percent acid) ionomer resin or ionomer blend. Preferably, the inner layer is comprised of a blend of two or more high acid (i.e. at least 16 weight percent acid) ionomer resin neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball.

The inner layer compositions include the high acid ionomers such as those recently developed by E. I. DuPont de Nemours & Company under the trademark "Surlyn®" and by Exxon Corporation under the trademark "Escor®" or tradename "Iotek", or blends thereof. Examples of compositions which may be used as the inner layer herein are set forth in detail in copending U.S. Ser. No. 07/776,803 filed Oct. 15, 1991, and Ser. No. 07/901,660 filed Jun. 19, 1992, both incorporated herein by reference. Of course, the inner layer high acid ionomer compositions are not limited in any way to those compositions set forth in said copending applications. For example, the high acid ionomer resins recently developed by Spalding & Evenflo Companies, Inc., the assignee of the present invention, and disclosed in U.S. Ser. No. 07/901,680, filed Jun. 19, 1992, incorporated herein by reference, may also be utilized to produce the inner layer of the multi-layer cover used in the present invention.

The high acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18% to about 21.5% by weight of a carboxylic acid.

Although the inner layer cover composition preferably includes a high acid ionomeric resin and the scope of the patent embraces all known high acid ionomeric resins falling within the perimeters set forth above, only a relatively limited number of these high acid ionomeric resins have recently become commercially available.

The high acid ionomeric resins available from Exxon under the designation "Escor®" and or "Iotek", are somewhat similar to the high acid ionomeric resins available under the "Surlyn®" trademark. However, since the Escor®/Iotek ionomeric resins are sodium or zinc salts of poly (ethylene-acrylic acid) and the "Surlyn®" resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® AD-8422 (sodium cation), Surlyn® 8162 (zinc cation), Surlyn® SEP-503-1 (zinc cation), Surlyn® SEP-503-2 (magnesium cation), and Surlyn® 8552 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422–2, AD-8422–3, AD-8422–5, etc.) based upon differences in melt index. According to DuPont, Surlyn® AD-8422 offers the following general properties when compared to Surlyn®8920, the stiffest, hardest of all on the low acid grades (referred to as "hard" ionomers in U.S. Pat. No. 4,884,814):

|  | LOW ACID (15 wt % Acid) | HIGH ACID (>20 wt % Acid) | |
|---|---|---|---|
|  | SURLYN ® 8920 | SURLYN ® 8422-2 | SURLYN ® 8422-3 |
| IONOMER |  |  |  |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP¹ ° C. | 88 | 86 | 85 |
| FP¹ ° C. | 47 | 48.5 | 45 |
| COMPRESSION MOLDING² |  |  |  |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

¹DSC second heat, 10° C./min heating rate.
²Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn SEP-503-1 and SEP-503-2 ionomers can be defined as follows:

| Surlyn ® Ionomer | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn® 8162 is a zinc cation ionomer resin containing approximately 20% by weight (i.e. 18.5–21.5% weight) methacrylic acid copolymer that has been 30–70% neutralized. Surlyn® 8162 is currently commercially available from DuPont.

Additionallt, Surlyn® 8552 is a magnesium cation ionomeric resin containing approximately 19% by weight methacrylic acid. The properties of Surlyn® 8552 are as follows:

| | Surlyn ® 8552 |
|---|---|
| % Acid Type | 19% MA |
| Ionomer Type | Copolymer |
| Cation | Mg |
| Melt Index | 1.3 |
| Stiffness Modulus *2 | 3499 Kfg/cm$^2$ |

Examples of the high acid acrylic acid based ionomers suitable for use in the present invention also include the Escor® or Iotek high acid ethylene acrylic acid ionomers produced by Exxon. In this regard, Escor® or Iotek 959 is a sodium ion neutralized ethylene-acrylic neutralized ethylene-acrylic acid copolymer. According to Exxon, Ioteks 959 and 960 contain from about 19.0 to about 21.0% by weight acrylic acid with approximately 30 to about 70 percent of the acid groups neutralized with sodium and zinc ions, respectively. The physical properties of these high acid acrylic acid based ionomers are as follows:

| PROPERTY | ESCOR ® (IOTEK) 959 | ESCOR ® (IOTEK) 960 |
|---|---|---|
| Melt Index, g/10 min | 2.0 | 1.8 |
| Cation | Sodium | Zinc |
| Melting Point, ° F. | 172 | 174 |
| Vicat Softening Point, ° F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

Additional high acid hard ionomer resins are also available from Exxon such as Iotek 1002 and Iotek 1003. Iotek 1002 is a sodium ion neutralized high acid ionomer (i.e., 18% by weight acid) and Iotek 1003 is a zinc ion neutralized high acid ionomer (i.e., 18% by weight acid). The properties of these ionomers are set forth below:

| IOTEK 1002 | | | |
|---|---|---|---|
| Property | Unit | Value | Method |
| General properties | | | |
| Melt index | g/10 min | 1.6 | ASTM-D 1238 |
| Density | kg/m$^3$ | | ASTM-D 1505 |
| Cation type | | Na | |
| Melting point | ° C. | 33.7 | ASTM-D 3417 |
| Crystallization point | ° C. | 43.2 | ASTM-D 3417 |
| Plaque properties | | | |
| Tensile at break | MPa | 31.7 | ASTM-D 638 |
| Tensile at yield | MPa | 22.5 | ASTM-D 638 |
| Elongation at break | % | 348 | ASTM-D 638 |
| 1% Secant modulus | MPa | 418 | ASTM-D 638 |
| 1% Flexural modulus | MPa | 380 | ASTM-D 790 |
| Hardness Shore D | | 52 | ASTM-D 2240 |
| Vicet softening point | ° C. | 51.5 | ASTM-D 1525 |

| IOTEK 1003 | | | |
|---|---|---|---|
| Property | Unit | Value | Method |
| General properties | | | |
| Melt index | g/10 min | 1.1 | ASTM-D 1238 |
| Density | kg/m$^3$ | | ASTM-D 1505 |
| Cation type | | Zn | EXXON |
| Melting point | ° C. | 52 | ASTM-D 3417 |
| Crystallization point | ° C. | 51.5 | ASTM-D 3417 |
| Plaque properties | | | |
| Tensile at break | MPa | 24.8 | ASTM-D 638 |
| Tensile at yield | MPa | 14.8 | ASTM-D 638 |
| Elongation at break | % | 357 | ASTM-D 638 |
| 1% Secant modulus | MPa | 145 | ASTM-D 638 |
| 1% Flexural modulus | MPa | 147 | ASTM-D 790 |
| Hardness Shore D | | 54 | ASTM-D 2240 |
| Vicet softening point | ° C. | 56 | ASTM-D 1525 |

Furthermore, as a result of the development by the inventor of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially harder inner cover layers for multi-layered golf balls having higher C.O.R.'s than those produced by the low acid ionomer inner cover compositions presently commercially available.

More particularly, several new metal cation neutralized high acid ionomer resins have been produced by the inventor by neutralizing, to various extents, high acid copolymers of an alpha-olefin and an alpha, beta-unsaturated carboxylic acid with a wide variety of different metal cation salts. This discovery is the subject matter of U.S. application Ser. No. 901,680, incorporated herein by reference. It has been found that numerous new metal cation neutralized high acid ionomer resins can be obtained by reacting a high acid copolymer (i.e. a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e. from about 10% to 90%).

Midland, Mich., under the "Primacor" designation. These high acid base copolymers exhibit the typical properties set forth below in Table 1.

TABLE 1

Typical Properties of Primacor Ethylene-Acrylic Acid Copolymers

| GRADE ASTM | PERCENT ACID | DENSITY, g/cc D-792 | MELT INDEX, g/10 min D-1238 | TENSILE YD. ST (psi) D-638 | FLEXURAL MODULUS (psi) D-790 | VICAT SOFT PT (° C.) D-1525 | SHORE D HARDNESS D-2240 |
|---|---|---|---|---|---|---|---|
| 5980 | 20.0 | 0.958 | 300.0 | — | 4800 | 43 | 50 |
| 5990 | 20.0 | 0.955 | 1300.0 | 650 | 2600 | 40 | 42 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1]The Melt Index values are obtained according to ASTM D-1238, at 190° C..

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Due to the high molecular weight of the Primacor 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 2, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 2

| Formulation No. | Wt-% Cation Salt | Wt-% Neutralization | Melt Index | C.O.R. | Shore D Hardness |
|---|---|---|---|---|---|
| 1 (NaOH) | 6.98 | 67.5 | 0.9 | .804 | 71 |
| 2 (NaOH) | 5.66 | 54.0 | 2.4 | .808 | 73 |
| 3 (NaOH) | 3.84 | 35.9 | 12.2 | .812 | 69 |
| 4 (NaOH) | 2.91 | 27.0 | 17.5 | .812 | (brittle) |
| 5 (MnAc) | 19.6 | 71.7 | 7.5 | .809 | 73 |
| 6 (MnAc) | 23.1 | 88.3 | 3.5 | .814 | 77 |
| 7 (MnAc) | 15.3 | 53.0 | 7.5 | .810 | 72 |
| 8 (MnAc) | 26.5 | 106 | 0.7 | .813 | (brittle) |
| 9 (LiOH) | 4.54 | 71.3 | 0.6 | .810 | 74 |
| 10 (LiOH) | 3.38 | 52.5 | 4.2 | .818 | 72 |
| 11 (LiOH) | 2.34 | 35.9 | 18.6 | .815 | 72 |
| 12 (KOH) | 5.30 | 36.0 | 19.3 | Broke | 70 |
| 13 (KOH) | 8.26 | 57.9 | 7.18 | .804 | 70 |
| 14 (KOH) | 10.7 | 77.0 | 4.3 | .801 | 67 |
| 15 (ZnAc) | 17.9 | 71.5 | 0.2 | .806 | 71 |
| 16 (ZnAc) | 13.9 | 53.0 | 0.9 | .797 | 69 |
| 17 (ZnAc) | 9.91 | 36.1 | 3.4 | .793 | 67 |
| 18 (MgAc) | 17.4 | 70.7 | 2.8 | .814 | 74 |
| 19 (MgAc) | 20.6 | 87.1 | 1.5 | .815 | 76 |
| 20 (MgAc) | 13.8 | 53.8 | 4.1 | .814 | 74 |
| 21 (CaAc) | 13.2 | 69.2 | 1.1 | .813 | 74 |
| 22 (CaAc) | 7.12 | 34.9 | 10.1 | .808 | 70 |

Controls:
50/50 Blend of Ioteks 8000/7030 C.O.R. = .810/65 Shore D Hardness
DuPont High Acid Surlyn ® 8422 (Na) C.O.R. = .811/70 Shore D Hardness
DuPont High Acid Surlyn ® 8162 (Zn) C.O.R. = .807/65 Shore D Hardness
Exxon High Acid Iotek EX-960 (Zn) C.O.R. = .796/65 Shore D Hardness

| Formulation No. | Wt-% Cation Salt | Wt-% Neutralization | Melt Index | C.O.R. |
|---|---|---|---|---|
| 23 (MgO) | 2.91 | 53.5 | 2.5 | .813 |
| 24 (MgO) | 3.85 | 71.5 | 2.8 | .808 |
| 25 (MgO) | 4.76 | 89.3 | 1.1 | .809 |
| 26 (MgO) | 1.96 | 35.7 | 7.5 | .815 |

Control for Formulations 23–26 is 50/50 Iotek 8000/7030, C.O.R. = 814, Formulation 26 C.O.R. was normalized to that control accordingly

| Formulation No. | Wt-% Cation Salt | Wt-% Neutralization | Melt Index | C.O.R. | Shore D Hardness |
|---|---|---|---|---|---|
| 27 (NiAc) | 13.04 | 61.1 | 0.2 | .802 | 71 |
| 28 (NiAc) | 10.71 | 48.9 | 0.5 | .799 | 72 |
| 29 (NiAc) | 8.26 | 36.7 | 1.8 | .796 | 69 |
| 30 (NiAc) | 5.66 | 24.4 | 7.5 | .786 | 64 |

Control for Formulation Nos. 27–30 is 50/50 Iotek 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451.

Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel farther than previously known multi-layered golf balls produced with low acid ionomer resin covers due to the balls' enhanced coefficient of restitution values.

The low acid ionomers which may be suitable for use in formulating the inner layer compositions of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10–75%, preferably 30–70%) by the metal ions. Each of the low acid ionomer resins which may be included in the inner layer cover compositions of the invention contains 16% by weight or less of a carboxylic acid.

When utilized in the construction of the inner layer of an additional embodiment of a multi-layered golf ball of the present invention, it has been found that the low acid ionomer blends extend the range of compression and spin rates beyond that previously obtainable. More preferably, it has been found that when two or more low acid ionomers, particularly blends of sodium and zinc high acid ionomers, are processed to produce the covers of multi-layered golf balls, (i.e., the inner cover layer herein) the resulting golf balls will travel farther and at an enhanced spin rate than previously known multi-layered golf balls. Such an improvement is particularly noticeable in enlarged or over-sized golf balls.

With respect to the outer layer 16 of the multi-layered cover of the present invention, the outer cover layer is comparatively softer than the inner layer. The softness provides for the enhanced feel and playability characteristics typically associated with balata or balata-blend balls. The outer layer or ply is comprised of a relatively soft, low modulus (about 1,000 psi to about 10,000 psi) and low acid (less than 16 weight percent acid) ionomer, ionomer blend or a non-ionomeric elastomer such as, but not limited to, a polyurethane, a polyester elastomer such as that marketed by DuPont under the trademark Hytrel®, a polyurethane sold by BASF under the designation Baytec® or a polyether amide such as that marketed by Elf Atochem S.A. under the trademark Pebax®. The outer layer is fairly thin (i.e. from about 0.010 to about 0.110 in thickness, more desirably 0.03 to 0.06 inches in thickness for a 1.680 inch ball and 0.04 to 0.07 inches in thickness for a 1.72 inch ball), but thick enough to achieve desired playability characteristics while minimizing expense.

Preferably, the outer layer includes a blend of hard and soft (low acid) ionomer resins such as those described in U.S. Pat. Nos. 4,884,814 and 5,120,791, both incorporated herein by reference. Specifically, a desirable material for use in molding the outer layer comprises a blend of a high modulus (hard), low acid, ionomer with a low modulus (soft), low acid, ionomer to form a base ionomer mixture. A high modulus ionomer herein is one which measures from about 15,000 to about 70,000 psi as measured in accordance with ASTM method D-790. The hardness may be defined as at least 50 on the Shore D scale as measured in accordance with ASTM method D-2240.

A low modulus ionomer suitable for use in the outer layer blend has a flexural modulus measuring from about 1,000 to about 10,000 psi, with a hardness of about 20 to about 40 on the Shore D scale.

The hard ionomer resins utilized to produce the outer cover layer composition hard/soft blends include ionic copolymers which are the sodium, zinc, magnesium or lithium salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15–75 percent) neutralized.

The hard ionomeric resins are likely copolymers of ethylene and either acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation "Iotek" are somewhat similar to the hard ionomeric resins sold under the Surlyn® trademark. However, since the "Iotek" ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard "Iotek" resins (i.e., the acrylic acid based hard ionomer resins) are the more preferred hard resins for use in formulating the outer layer blends for use in the present invention. In addition, various blends of "Iotek" and Surlyn® hard ionomeric resins, as well as other available ionomeric resins, may be utilized in the present invention in a similar manner.

Examples of commercially available hard ionomeric resins which may be used in the present invention in formulating the inner and outer cover blends include the hard sodium ionic copolymer sold under the trademark Surlyn®8940 and the hard zinc ionic copolymer sold under the trademark Surlyn®9910. Surlyn®8940 is a copolymer of ethylene with methacrylic acid and about 15 weight percent acid which is about 29 percent neutralized with sodium ions. This resin has an average melt flow index of about 2.8. Surlyn®9910 is a copolymer of ethylene and methacrylic acid with about 15 weight percent acid which is about 58 percent neutralized with zinc ions. The average melt flow index of Surlyn®9910 is about 0.7. The typical properties of Surlyn®9910 and 8940 are set forth below in Table 3:

TABLE 3

Typical Properties of Commercially Available Hard Surlyn ® Resins
Suitable for Use in the Inner and Outer Layer Blends of the Present Invention

|  | ASTM D | 8940 | 9910 | 8920 | 8528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) | (3.6) | (5.4) | (4.2) | (3.2) | (4.1) |
|  |  | 33.1 | 24.8 | 37.2 | 29.0 | 22.0 | 28.0 |
| Elongation, % | D-638 | 470 | 290 | 350 | 450 | 460 | 460 |
| Flexural Modulus, (kpsi) MPa | D-790 | (51) | (48) | (55) | (32) | (28) | (30) |
|  |  | 350 | 330 | 380 | 220 | 190 | 210 |
| Tensile Impact (23° C.) | D-1822S | 1020 | 1020 | 865 | 1160 | 760 | 1240 |
| KJ/m$_2$ (ft. − lbs./in$^2$) |  | (485) | (485) | (410) | (550) | (360) | (590) |
| Viscat Temperature, ° C. | D-1525 | 63 | 62 | 58 | 73 | 61 | 73 |

Examples of the more pertinent acrylic acid based hard ionomer resin suitable for use in the present inner and outer cover composition sold under the "Iotek" tradename by the Exxon Corporation include Iotek 4000, Iotek 4010, Iotek 8000, Iotek 8020 and Iotek 8030. The typical properties of these and other Iotek hard ionomers suited for use in formulating the inner and outer layer cover compositions are set forth below in Table 4:

TABLE 4

Typical Properties of Iotek Ionomers

|  | ASTM Method | Units | 4000 | 4010 | 8000 | 8020 | 8030 |
|---|---|---|---|---|---|---|---|
| Resin Properties |  |  |  |  |  |  |  |
| Cation type |  |  | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |

TABLE 4-continued

| | | | | | | | |
|---|---|---|---|---|---|---|---|
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid | | | | | 16 | | 11 |
| % of Acid Groups cation neutralized | | | 30 | | 40 | | |
| Plaque Properties (3 mm thick, compression molded) | | | | | | | |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |
| Film Properties (50 micron film 2.2:1 Blow-up ratio) | | | | | | | |
| Tensile at Break MD | D-882 | MPa | 41 | 39 | 42 | 52 | 47.4 |
| TD | D-882 | MPa | 37 | 38 | 38 | 38 | 40.5 |
| Yield point MD | D-882 | MPa | 15 | 17 | 17 | 23 | 21.6 |
| TD | D-882 | MPa | 14 | 15 | 15 | 21 | 20.7 |
| Elongation at Break MD | D-882 | % | 310 | 270 | 260 | 295 | 305 |
| TD | D-882 | % | 360 | 340 | 280 | 340 | 345 |
| 1% Secant modulus MD | D-882 | MPa | 210 | 215 | 390 | 380 | 380 |
| TD | D-882 | MPa | 200 | 225 | 380 | 350 | 345 |
| Dart Drop Impact | D-1709 | g/micron | 12.4 | 12.5 | 20.3 | | |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m³ | 960 | 960 | 960 |
| Melting Point | D-3417 | ° C. | 90 | 90 | 90 |
| Crystallization Point | D-3417 | ° C. | — | — | — |
| Vicat Softening Point | D-1525 | ° C. | 60 | 63 | 62.5 |
| % Weight Acrylic Acid | | | — | — | — |
| % of Acid Groups Cation Neutralized | | | — | — | — |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| 1% Secant modulus | D-638 | MPa | — | — | — |
| Shore Hardness D | D-2240 | — | 57 | 55 | 55 |

Comparatively, soft ionomers are used in formulating the hard/soft blends of the inner and outer cover compositions. These ionomers include acrylic acid based soft ionomers. They are generally characterized as comprising sodium or zinc salts of a terpolymer of an olefin having from about 2 to 8 carbon atoms, acrylic acid, and an unsaturated monomer of the acrylate ester class having from 1 to 21 carbon atoms. The soft ionomer is preferably a zinc based ionomer made from an acrylic acid base polymer in an unsaturated monomer of the acrylate ester class. The soft (low modulus) ionomers have a hardness from about 20 to about 40 as measured on the Shore D scale and a flexural modulus from about 1,000 to about 10,000, as measured in accordance with ASTM method D-790.

Certain ethylene-acrylic acid based soft ionomer resins developed by the Exxon Corporation under the designation "Iotek 7520" (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the inner and outer layers of multi-layer balls produced by other known hard-soft ionomer blends as a result of the lower overall raw materials costs and improved yields.

While the exact chemical composition of the resins to be sold by Exxon under the designation Iotek 7520 is considered by Exxon to be confidential and proprietary information, Exxon's experimental product data sheet lists the following physical properties of the ethylene acrylic acid zinc ionomer developed by Exxon:

TABLE 5

| Property | ASTM Method | Units | Typical Value |
|---|---|---|---|
| Physical Properties of Iotek 7520 | | | |
| Melt Index | D-1238 | g/10 min. | 2 |
| Density | D-1505 | kg/m³ | 0.962 |
| Cation | | | Zinc |
| Melting Point | D-3417 | ° C. | 66 |
| Crystallization Point | D-3417 | ° C. | 49 |
| Vicat softening Point | D-1525 | ° C. | 42 |
| Plaque Properties (2 mm thick Compression Molded Plaques) | | | |
| Tensile at Break | D-638 | MPa | 10 |
| Yield Point | D-638 | MPa | None |

TABLE 5-continued

| Property | ASTM Method | Units | Typical Value |
|---|---|---|---|
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, test data collected by the inventor indicates that Iotek 7520 resins have Shore D hardnesses of about 32 to 36 (per ASTM D-2240), melt flow indexes of 3±0.5 g/10 min (at 190° C. per ASTM D-1288), and a flexural modulus of about 2500–3500 psi (per ASTM D-790). Furthermore, testing by an independent testing laboratory by pyrolysis mass spectrometry indicates that Iotek 7520 resins are generally zinc salts of a terpolymer of ethylene, acrylic acid, and methyl acrylate.

Furthermore, the inventor has found that a newly developed grade of an acrylic acid based soft ionomer available from the Exxon Corporation under the designation Iotek 7510, is also effective, when combined with the hard ionomers indicated above in producing golf ball covers exhibiting higher C.O.R. values at equal or softer hardness than those produced by known hard-soft ionomer blends. In this regard, Iotek 7510 has the advantages (i.e. improved flow, higher C.O.R. values at equal hardness, increased clarity, etc.) produced by the Iotek 7520 resin when compared to the methacrylic acid base soft ionomers known in the art (such as the Surlyn 8625 and the Surlyn 8629 combinations disclosed in U.S. Pat. No. 4,884,814).

In addition, Iotek 7510, when compared to Iotek 7520, produces slightly higher C.O.R. valves at equal softness/hardness due to the Iotek 7510's higher hardness and neutralization. Similarly, Iotek 7510 produces better release properties (from the mold cavities) due to its slightly higher stiffness and lower flow rate than Iotek 7520. This is important in production where the soft covered balls tend to have lower yields caused by sticking in the molds and subsequent punched pin marks from the knockouts.

According to Exxon, Iotek 7510 is of similar chemical composition as Iotek 7520 (i.e. a zinc salt of a terpolymer of ethylene, acrylic acid, and methyl acrylate) but is more highly neutralized. Based upon FTIR analysis, Iotek 7520 is estimated to be about 30–40 wt.-% neutralized and Iotek 7510 is estimated to be about 40–60 wt.-% neutralized. The typical properties of Iotek 7510 in comparison of those of Iotek 7520 are set forth below:

TABLE 6

Physical Properties of Iotek 7510 in Comparison to Iotek 7520

| | IOTEK 7520 | IOTEK 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

It has been determined that when hard/soft ionomer blends are used for the outer cover layer, good results are achieved when the relative combination is in a range of about 90 to about 10 percent hard ionomer and about 10 to about 90 percent soft ionomer. The results are improved by adjusting the range to about 75 to 25 percent hard ionomer and 25 to 75 percent soft ionomer. Even better results are noted at relative ranges of about 60 to 90 percent hard ionomer resin and about 40 to 60 percent soft ionomer resin.

Specific formulations which may be used in the cover composition are included in the examples set forth in U.S. Pat. No. 5,120,791 and 4,884,814. The present invention is in no way limited to those examples.

Moreover, in alternative embodiments, the outer cover layer formulation may also comprise a soft, low modulus non-ionomeric thermoplastic elastomer including a polyester polyurethane such as B.F.Goodrich Company's Estane® polyester polyurethane X4517. According to B. F. Goodrich, Estane® X-4517 has the following properties:

| Properties of Estane ® X-4517 | |
|---|---|
| Tensile | 1430 |
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity (H$_2$O = 1) | 1.1–1.3 |

Other soft, relatively low modulus non-ionomeric thermoplastic elastomers may also be utilized to produce the outer cover layer as long as the non-ionomeric thermoplastic elastomers produce the playability and durability characteristics desired without adversely effecting the enhanced spin characteristics produced by the low acid ionomer resin compositions. These include, but are not limited to thermoplastic polyurethanes such as: Texin thermoplastic polyurethanes from Bayer Chemical Co. and the Pellethane thermoplastic polyurethanes from Dow Chemical Co.; Ionomer/rubber blends such as those in Spalding U.S. Pat. Nos. 4,986,545; 5,098,105 and 5,187,013; and, Hytrel polyester elastomers from DuPont and pebax polyetheramides from Elf Atochem S.A.

Similarly, a castable, thermosetting polyurethane produced by Bayer under the trade designation Baytec® has also shown enhanced cover formulation properties. According to Bayer, Baytec® (such as Baytec® RE 832), relates to a group of reactive elastomers having outstanding wear resistance, high mechanical strength, high elasticity and good resistance to weathering, moisture and chemicals. The Baytec® RE-832 system gives the following typical physical properties:

| Property | ASTM Test Method | Unit | Value |
|---|---|---|---|
| Tear Strength Die C | D624 | pli | 180 |
| Stress at | | | |
| 100% Modulus | D412 | psi | 320 |
| 200% Modulus | | | 460 |

-continued

| | | | |
|---|---|---|---|
| 300% Modulus | | | 600 |
| Ultimate Strength | D412 | psi | 900 |
| Elongation at Break | D412 | % | 490 |
| Taber Abrasion | D460, H-18 | mg/1000 cycles | 350 |

| Component[1] Properties | Part A (Isocyanate) | Part B (Resin) |
|---|---|---|
| Viscosity @ 25° C., mPa.s | 2500 | 2100 |
| Density @ 25° C., g/cm | 1.08 | 1.09 |
| NCO, % | 9.80 | — |
| Hydroxyl Number, Mg KOH/g | — | 88 |

[1]Component A is a modified diphenylmethane diisocyanate (mDI) prepolymer and component B is a polyether polyol blend.

The weight of the cover layers is increased in the present invention by making the cover layers thicker and through the inclusion of 1–100 parts per hundred parts resin of metal particles and other heavy weight filler materials. As used herein, the term "heavy weight filler materials" is defined as any material having a specific gravity greater than 1.0 (g/cc).

As noted above, it has been found that increasing the weight of the ball towards the outer perimeter produces an increase in the ball's moment of inertia. Preferably, the particles (or flakes, fragments, fibers, etc.) of heavy filler are added to the inner cover layer as opposed to the outer cover, in order to increase the moment of inertia of the ball without effecting the ball's feel and durability characteristics.

The inner layer is filled with one or more of a variety of reinforcing or non-reinforcing heavy weight fillers or fibers such as metal (or metal alloy) powders, carbonaceuus materials (i.e., graphite, carbon black, cotton flock, leather fiber, etc.), glass, Kevlar® fibers (trademarked material of Du Pont for an aromatic polyamide fiber of high tensile strength and greater resistance of elongation than steel), etc. These heavy weight filler materials range in size from 10 mesh to 325 mesh, preferably 20 mesh to 325 mesh and most preferably 100 mesh to 325 mesh. Representatives of such metal (or metal alloy) powders include but are not limited to, bismuth powder, boron powder, brass powder, bronze powder, cobalt powder, copper powder, inconnel metal powder, iron metal powder, molybdenium powder, nickel powder, stainless steel powder, titanium metal powder, zirconium oxide powder, aluminum flakes, and aluminum tadpoles.

Examples of several suitable heavy filler materials which can be included in the present invention are as follows:

| Filler Type | Spec. Grav. |
|---|---|
| graphite fibers | 1.5–1.8 |
| precipitated hydrated silica | 2.0 |
| clay | 2.62 |
| talc | 2.85 |
| absestos | 2.5 |
| glass fibers | 2.55 |
| aramid fibers (Kevlar ®) | 1.44 |
| mica | 2.8 |
| calcium metasilicate | 2.9 |
| barium sulfate | 4.6 |
| zinc sulfate | 4.1 |
| silicates | 2.1 |
| diatomaceous earth | 2.3 |
| calcium carbonate | 2.71 |
| magnesium carbonate | 2.20 |
| Metals and Alloys (powders) | |
| titanium | 4.51 |
| tungsten | 19.35 |
| aluminum | 2.70 |
| bismuth | 9.78 |
| nickel | 8.90 |
| molybdenum | 10.2 |
| iron | 7.86 |
| copper | 8.94 |
| brass | 8.2–8.4 |
| boron | 2.364 |
| bronze | 8.70–8.74 |
| cobalt | 8.92 |
| beryllium | 1.84 |
| zinc | 7.14 |
| tin | 7.31 |
| Metal Oxides | |
| zinc oxide | 5.57 |
| iron oxide | 5.1 |
| aluminum oxide | 4.0 |
| titanium dioxide | 3.9–4.1 |
| magnesium oxide | 3.3–3.5 |
| zirconium oxide | 5.73 |
| Metal Stearates | |
| zinc stearate | 1.09 |
| calcium stearate | 1.03 |
| barium stearate | 1.23 |
| lithium stearate | 1.01 |
| magnesium stearate | 1.03 |
| Particulate carbonaceous materials | |
| graphite | 1.5–1.8 |
| carbon black | 1.8 |
| natural bitumen | 1.2–1.4 |
| cotton flock | 1.3–1.4 |
| cellulose flock | 1.15–1.5 |
| leather fiber | 1.2–1.4 |

The amount and type of heavy weight filler material utilized is dependent upon the overall characteristics of the low spinning multi-layered golf ball desired. Generally, lesser amounts of high specific gravity materials are necessary to produce an increase in the moment of inertia in comparison to low specific gravity materials. Furthermore, handling and processing conditions can also effect the type of heavy weight filler material incorporated into cover layers. In this regard, Applicant has found that the inclusion of approximately 10 phr brass powder into inner cover layer produces the desired increase in the moment of inertia without involving substantial processing changes. Additionally, the inclusion of about 19.0 [[h bronze powder in the inner cover layer also provides the desired perimeter weighting advantages to golf balls of the present invention.

Additional materials may be added to the cover compositions (both inner and outer cover layer) of the present invention including dyes (for example, Ultramarine Blue sold by Whitaker, Clark and Daniels of South Plainsfield, N.J.) (see U.S. Pat. No. 4,679,795); pigments such as titanium dioxide, zinc oxide, barium sulfate and zinc sulfate; and UV absorbers; antioxidants; antistatic agents; and stabilizers. Further, the cover compositions of the present invention may also contain softening agents, such as plasticizers, processing aids, etc., as long as the desired properties produced by the golf ball covers are not impaired.

In preparing golf balls in accordance with the present invention, a hard, relatively heavy, inner cover layer is molded (by injection molding or by compression molding) about a relatively light core (preferably a lighter and smaller solid core). A comparatively softer outer cover layer is molded over the inner cover layer.

The core (preferably a solid core) is about 1.28 inches to 1.570 inches in diameter (preferably about 1.37 to about 1.54 inches, and most preferably 1.42 inches). The cores weigh about 18 to 39 grams, desirably 25 to 30, and most preferably 29.7–29.8 grams.

The solid cores are typically compression molded from a slug of uncured or lightly cured elastomer composition comprising a high cis content polybutadiene and a metal salt of an α, β, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, lesser amounts of metal oxide can be included in order to lighten the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

The specially produced core compositions and resulting molded cores of the present invention are manufactured using relatively conventional techniques. In this regard, the core compositions of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about 100,000 to about 500,000. As a base elastomer for the core composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed. Along this line, it has been found that the high cis-polybutadiene manufactured and sold by Shell Chemical Co., Houston, Texas, under the tradename Cariflex BR-1220, the high cis-polybutadiene sold by Bayer Corp. under the designation Taktene 220, and the polyisoprene available from Muehlstein, H & Co., Greenwich, Conn. under the designation "SKI 35" are particularly well suited.

In accordance with another aspect of the present invention, the compositions of the present invention comprise one or more rubber or elastomeric components and an array of non-rubber or non-elastomeric components. The rubber components of the core compositions of the invention comprise a particular polybutadiene synthesized with cobalt and having an ultra-high Mooney viscosity and certain molecular weight characteristics described in detail below, one or more particular polybutadienes synthesized with neodymium, and one or more other optional polybutadienes. In some applications, polybutadienes synthesized with nickel catalysts may be used in combination with or instead of polybutadienes synthesized with cobalt catalysts. And, polybutadienes synthesized with lanthanide series catalysts may be used in combination with or instead of polybutadienes synthesized with neodymium catalysts. The non-rubber components of the core compositions of the invention comprise one or more crosslinking agents which preferably include an unsaturated carboxylic acid component, a free radical initiator to promote cross linking, one or more optional modifying agents, fillers, moldability additives, processing additives, and dispersing agents, all of which are described in greater detail below.

A preferred polybutadiene resin for use in the present invention composition has a relatively ultra high Mooney viscosity. A "Mooney unit" is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$(100° C.], is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

A first particular polybutadiene for use in the preferred embodiment compositions of the present invention exhibits a Mooney viscosity of from about 65 to about 85, and preferably from about 70 to about 83. The first particular polybutadiene has a number average molecular weight $M_n$ of from about 90,000 to about 130,000; and preferably from about 100,000 to about 120,000. The first particular polybutadiene has a weight average molecular weight $M_w$ of from about 250,000 to about 350,000; and preferably from about 290,000 to about 310,000. The first particular polybutadiene has a Z-average molecular weight $M_z$ of about 600,000 to about 750,000; and preferably from about 660,000 to about 700,000. The first particular polybutadiene has a peak molecular weight $M_{peak}$ of about 150,000 to about 200,000; and preferably from about 170,000 to about 180,000.

The polydispersity of the first particular polybutadiene for use in the preferred embodiment compositions typically ranges from about 1.9 to about 3.9; and preferably from about 2.4 to about 3.1. Most preferably, the polydispersity is about 2.7.

The first particular polybutadiene for use in the preferred embodiment compositions preferably contains a majority fraction of polymer chains containing a cis-1,4 bond, more preferably, having a cis-1,4 polybutadiene content of about 90%, and most preferably, having a cis-1,4 polybutadiene content of at least about 95%. Another characteristic of the first preferred polybutadiene is that it is obtained or synthesized by utilizing a cobalt or cobalt-based catalyst. As noted herein, in some applications, a polybutadiene synthesized by using a nickel catalyst may be employed with, or in place of, the polybutadiene synthesized with a cobalt catalyst.

A commercially available polybutadiene corresponding to the noted first preferred ultra high viscosity polybutadiene, and which is suitable for use in the preferred embodiment compositions in accordance with the present invention is available under the designation Cariflex BCP 820, from Shell Chimie of France. Although this polybutadiene produces cores exhibiting higher C.O.R. values, it is somewhat difficult to process using conventional equipment. The properties and characteristics of this preferred polybutadiene are set forth below in Table 1.

TABLE 1

Properties of Shell Chimie BCP 820 (Also Known As BR-1202J)

| Property | Value | |
|---|---|---|
| Mooney Viscosity (approximate) | 70–83 | |
| Volatiles Content | 0.5% maximum | |
| Ash Content | 0.1% maximum | |
| Cis 1,4-polybutadiene Content | 95.0% minimum | |
| Stabilizer Content | 0.2 to 0.3% | |
| Polydispersity | 2.4–3.1 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The second polybutadiene for use in the preferred embodiment golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60. While the second polybutadiene provides covers exhibiting higher C.O.R. values, it exhibits very poor cold flow properties and very high dry swell characteristics.

Examples of such second polybutadienes obtained by using a neodymium-based catalyst include Neo Cis 40, Neo Cis 60 from Enichem. The properties of these polybutadienes are given below.

TABLE 2

Properties of Neo Cis

| Properties of Raw Polymer | |
|---|---|
| Microstructure | |
| 1,4 cis (typical) | 97.5% |
| 1,4 trans (typical) | 1.7% |
| Vinyl (typical) | 0.8% |
| Volatile Matter (max) | 0.75% |
| Ash (max) | 0.30% |
| Stabilizer (typical) | 0.50% |
| Mooney Viscosity, ML 1 + 4 at 100° C. | 38–48 and 60–66 |
| Properties of compound (typical) | |
| Vulcanization at 145° C. | |
| Tensile strength, 35' cure, | 16 MPa |
| Elongation, 35' cure, | 440% |
| 300% modulus, 35' cure, | 9.5 MPa |

It has been found that when the first and second polybutadienes are blended together within certain ranges, golf ball cores can be produced without the individual processing difficulties associated with each polybutadiene. In essence, a synergistic effect is produced allowing the blends to produce golf ball cores using conventional equipment exhibiting enhanced resilience.

The unsaturated carboxylic acid component of the core composition (a co-crosslinking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 25, and preferably from about 17 to about 21 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bis(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercially available peroxides are Luperco 230 or 231 XL sold by Atochem, Lucidol Division, Buffalo, N.Y., and Trigonox 17/40 or 29/40 sold by Akzo Chemie America, Chicago, Ill. In this regard Luperco 230 XL and Trigonox 17/40 are comprised of n-butyl 4,4-bis (butylperoxy) valerate; and, Luperco 231 XL and Trigonox 29/40 are comprised of 1,1-bis(t-butylperoxy)-3,3,5-trimethyl cyclohexane. The one hour half life of Luperco 231 XL is about 112° C., and the one hour half life of Trigonox 29/40 is about 129° C. Trigonox 42-40B from Akzo Nobel of Chicago, Ill. is an additional preferred peroxide according to the present invention. Most preferably, a solid form of this peroxide is used. Trigonox 42-40B is tert-Butyl peroxy-3,5, 5-trimethylhexanoate. The liquid form of this agent is available from Akzo under the designation Trigonox 42S.

The core compositions of the present invention may additionally contain any other suitable and compatible modifying ingredients including, but not limited to, metal oxides, fatty acids, and diisocyanates and polypropylene powder resin. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger. In addition, it has been found that the addition of a polypropylene powder resin results in a core which is too hard (i.e. exhibits low compression) and thus allows for a reduction in the amount of crosslinking agent utilized to soften the core to a normal or below normal compression.

Furthermore, because polypropylene powder resin can be added to core composition without an increase in weight of the molded core upon curing, the addition of the polypropylene powder allows for the addition of higher specific gravity fillers (if desired), such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintaining, or lowering, weight and compression.

The polypropylene $(C_3H_5)_n$ powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". Generally, from 0 to about 25 parts by weight polypropylene powder per each 100 parts of elastomer are included in the present invention.

Various activators may also be included in the compositions of the present invention. For example, zinc oxide and/or magnesium oxide are activators for the polybutadiene. The activator can range from about 2 to about 50 parts by weight per 100 parts by weight of the rubbers (phr) component. The amount of activation utilized can be reduced in order to lighten the weight of the core.

Moreover, reinforcement agents may be added to the composition of the present invention. As noted above, the specific gravity of polypropylene powder is very low, and when compounded, the polypropylene powder produces a lighter molded core. Further, when a lesser amount of activation is used, the core is also lighter. As a result, if necessary, higher gravity fillers may be added to the core composition so long as the specific core weight limitations are met. The amount of additional filler included in the core composition is primarily dictated by weight restrictions and preferably is included in amounts of from about 0 to about 100 parts by weight per 100 parts rubber.

Exemplary fillers include mineral fillers such as limestone, silica, micabarytes, calcium carbonate, or clays. Limestone is ground calcium/magnesium carbonate and is used because it is an inexpensive, heavy filler.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbamates set forth in U.S. Pat. No. 4,852,884 may also be incorporated into the polybutadiene compositions of the present invention. The specific types and amounts of such additives are set forth in the above identified patents, which are incorporated herein by reference.

The core compositions of the invention are generally comprised of 100 parts by weight of a base elastomer (or rubber) selected from polybutadiene and mixtures of polybutadiene with other elastomers, 10 to 40 parts by weight of at least one metallic salt of an unsaturated carboxylic acid, and 1 to 10 parts by weight of a free radical initiator.

As indicated above, additional suitable and compatible modifying agents such as particulate polypropylene resin, fatty acids, and secondary additives such as Pecan shell flour, ground flash (i.e. grindings from previously manufactured cores of substantially identical construction), barium sulfate, zinc oxide, etc. may be added to the core compositions to adjust the weight of the ball as necessary in order to have the finished molded ball (core, cover and coatings) to closely approach the U.S.G.A. weight limit of 1.620 ounces.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, polypropylene powder resin (if desired), fillers, zinc salt, metal oxide, fatty acid, and the metallic dithiocarbamate (if desired), surfactant (if desired), and tin difatty acid (if desired), are blended for about 7 minutes in an internal mixer such as a Banbury mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is rolled into a "pig" and then placed in a Barwell preformer and slugs are produced. The slugs are then subjected to compression molding at about 320° F. for about 14 minutes. After molding, the molded cores are cooled, the cooling effected at room temperature for about 4 hours or in cold water for about one hour. The molded cores are subjected to a centerless grinding operation whereby a thin layer of the molded core is removed to produce a round core having a diameter of 1.28 to 1.570 inches (preferably about 1.37 to about 1.54 inches and most preferably, 1.42 inches).

Alternatively, the cores are used in the as-molded state with no grinding needed to achieve roundness.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques known in the art, such as corona discharge, ozone treatment, sand blasting, and the like. Preferably, surface treatment is effected by grinding with an abrasive wheel.

The relatively thick inner cover layer which is molded over the core is about 0.200 inches to about 0.050 inches in thickness, preferably about 0.075 inches thick. The outer cover layer is about 0.010 inches to about 0.115 inches in thickness, preferably 0.055 inches thick. Together, the core, the inner cover layer and the outer cover layer combine to form a ball having a diameter of 1.680 inches or more, the minimum diameter permitted by the rules of the United States Golf Association and weighing about 1.620 ounces.

The various cover composition layers of the present invention may be produced according to conventional melt blending procedures. In the case of the outer cover layer, when a blend of hard and soft, low acid ionomer resins are utilized, the hard ionomer resins are blended with the soft ionomeric resins and with a masterbatch containing the desired additives in a Banbury mixer, two-roll mill, or extruder prior to molding. The blended composition is then formed into slabs and maintained in such a state until molding is desired. Alternatively, a simple dry blend of the pelletized or granulated resins and color masterbatch may be prepared and fed directly into the injection molding machine where homogenization occurs in the mixing section of the barrel prior to injection into the mold. If necessary, further additives, may be added and uniformly mixed before initiation of the molding process. A similar process is utilized to formulate the ionomer resin compositions used to produce the inner cover layer. The metal particles are added and mixed prior to initiation of molding.

The golf balls of the present invention can be produced by molding processes currently well known in the golf ball art. Specifically, the golf balls can be produced by injection molding or compression molding the relatively thick inner cover layer about smaller and lighter wound or solid molded cores to produce an intermediate golf ball having a diameter of about 1.38 to 1.68 inches, more preferably about 1.50 to 1.67 inches, and most preferably about 1.57 inches. The outer layer (preferably 0.010 inches to 0.110 inches in thickness) is subsequently molded over the inner layer to produce a golf ball having a diameter of 1.680 inches or more. Although either solid cores or wound cores can be used in the present invention so long as the size weight and other physical perimeters are met, as a result of their lower cost and superior performance, solid molded cores are preferred over wound cores.

In compression molding, the inner cover composition is formed via injection at about 380° F. to about 450° F. into smooth surfaced hemispherical shells which are then positioned around the core in a mold having the desired inner cover thickness and subjected to compression molding at 2000 to 300° F. for about 2 to 10 minutes, followed by cooling at 50° F. to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° F. to about 100° F. Subsequently, the outer cover layer is molded about the core and the inner layer by similar compression or injection molding techniques to form a dimpled golf ball of a diameter of 1.680 inches or more.

After molding, the golf balls produced may undergo various further processing steps such as buffing, painting and marking as disclosed in U.S. Pat. No. 4,911,451.

The finished golf ball of the present invention possesses the following general features:

A) Core (preferably a solid core)
1) Weight, from about 18 to 39 grams, preferably, 25 to 30 grams, most preferably 29.7–29.8 grams.
2) Size (diameter), from about 1.28 to 1.57 inches, preferably, 1.37 to 1.54 inches, most preferably 1.42 inches.
3) Specific gravity, from about 1.05 to 1.30, preferably 1.10 to 1.25, most preferably 1.2.
4) Compression (Riehle), from about 60 to about 170, preferably 110 to 140, most preferably 117 to 124.
5) Coefficient of Restitution (C.O.R.), from about 0.700 to about 0.800, preferably 0.740 to 0.780, most preferably 0.765 to 0.770.

B) Inner Cover Layer (Mantle) and Core
1) Weight, from about 25.9 to 43.0 grams, preferably, 29 to 40 grams, most preferably 38.4 grams.
2) Size (diameter), from about 1.38 to 1.68 inches, preferably, 1.50 to 1.67 inches, most preferably 1.57 inches.
3) Thickness of inner cover layer, from about 0.010 to about 0.200 inches, preferably 0.055 to 0.150, most preferably 0.075 inches.
4) Specific gravity (inner cover layer only), from about 0.96 to 1.80, preferably 1.00 to 1.30, most preferably 1.05.
5) Compression (Riehle), from about 59 to about 169, preferably 80 to 96, most preferably 84–92.
6) Coefficient of Restitution (C.O.R.), from about 0.701 to about 0.820, preferably 0.750 to 0.810, most preferably 0.790 to 0.800.
7) Shore C/D Hardness, from about 87/60 to about >100/100, preferably 92/65 to >100/85, most preferably 97/70.

C. Outer Cover Layer, Inner Cover Layer and Core
1) Weight, from about 45.0 to 45.93 grams, preferably, 45.3 to 45.7 grams, most preferably 45.5 grams.
2) Size (diameter), from about 1.680 to 1.720 inches, preferably, 1.680 to 1.700 inches, most preferably 1.68 inches.
3) Cover Thickness (outer cover layer), from about 0.010 to about 0.175 inches, preferably 0.010 to 0.110, most preferably 0.055 inches.
4) Compression (Riehle), from about 59 to about 160, preferably 80 to 96, most preferably 76–85.
5) Coefficient of Restitution (C.O.R.), from about 0.701 to about 0.825, preferably 0.750 to 0.810, most preferably 0.785 to 0.790.
6) Shore C/D Hardness, from about 35/20 to about 92/65, preferably 40/25 to 90/60, most preferably 87/56.
7) Moment of Inertia, from about 0.390 to about 0.480, preferably 0.430 to 0.460, most preferably 0.445.

The most preferred characteristic noted above are included in Applicants' soon to be commercialized "Strata Advance" balls. These balls ("Strata Advance 90" and "Strata Advance 100") contain smaller and lighter cores and heavier and thicker thermoplastic inner cover layers. The enhanced weight in the inner cover layer is produced, in part, through the inclusion of 10 phr of powdered brass. The displacement of weight from the core to the inner cover layer produces a golf ball with a greater moment of inertia, reduced spin and longer travel distance without affecting the balls' feel and durability characteristics. The components and physical properties of these balls are shown below.

| CORE | | | |
|---|---|---|---|
| Formulations | Advance 90 | Advance 100 | Range |
| Cariflex 1220 (High Cis-polybutadiene) | 70 | 70 | |
| Taktene 220 (High Cis-polybutadiene) | 30 | 30 | |
| Zinc Oxide | 31 | 30.5 | |
| TG Regrind (Core regrind) | 20 | 20 | |
| Zinc Diaxylate | 17.5 | 18.5 | |
| Zinc Stearate | 15 | 15 | |
| 231 XL Peroxide | 0.9 | 0.9 | |
| Core Data | | | |
| Size | 1.42" | 1.42" | +/−0.003 |
| Weight (grams) | 29.7 | 29.7 | +/−0.3 |
| Comp (Riehle) | 124 | 117 | +/−5 |
| C.O.R. | .765 | .770 | +/−.015 |
| Spec. Grav. | 1.2 | 1.2 | |

| MANTLE | | | | | |
|---|---|---|---|---|---|
| Formulations | Modulus | Spec. Grav. | Distance 90 | Distance 100 | Range |
| Iotek 1002 | 380 MPa | 0.95 | 45 | 45 | |
| Iotek 1003 | 147 MPa | 0.95 | 45 | 45 | |
| Powdered Brass | — | 8.5 | 10 | 10 | |
| Blend Modulus (Estimated) | | | 264 MPa | 264 MPa | |
| Spec. Grav. Blend | | | 1.05 | 1.05 | |
| Mantle Data | | | | | |
| Size | | | 1.57" | 1.57" | +/−0.003 |
| Thickness | | | 0.075" | 0.075" | +/−0.003 |
| Weight (grams) | | | 38.4 | 38.4 | +/−0.3 |
| Comp (Riehle) | | | 92 | 84 | +/−4 |
| COR | | | .795 | .800 | +/−.015 |
| Shore C/D | | | 97/70 | 97/70 | +/−1 |

| COVER | | | | |
|---|---|---|---|---|
| Formulations | Modulus | Advance 90 | Advance 100 | Range |
| Iotek 7510 | 35 MPa | 58.9 | 58.9 | |
| Iotek 8000 | 320 MPa | 33.8 | 33.8 | |
| Iotek 7030 | 155 MPa | 7.3 | 7.3 | |
| Blend Modulus (Estimated) | | 140 MPa | 140 MPa | |
| Spec. Grav. Blend | | 0.98 | 0.98 | |
| Whitener Package | | | | |
| Unitane O-110[1] | | 2.3 phr | 2.3 phr | |
| Eastobrite OB-1[2] | | 0.025 phr | 0.025 phr | |
| Ultra Marine Blue[3] | | 0.042 phr | 0.042 phr | |
| Santonox R[4] | | 0.004 phr | 0.004 phr | |
| Ball Data | | | | |
| Size | | 1.68" | 1.68" | +/−0.003 |
| Cover Thickness | | 0.055" | 0.055" | +/−0.003 |
| Weight (grams) | | 45.5 | 45.5 | +/−0.4 |
| Comp (Riehle) | | 80 | 76 | +/−4 |
| C.O.R. | | .785 | .790 | +/−.015 |
| Shore C/D | | 87/56 | 87/56 | +/−1 |
| Moment of Inertia | | 0.445 | 0.445 | — |

[1]Kemira Pigments Inc, Savannah, GA
[2]Eastmanchemicals, Kingsport, TX
[3]Whittaker, Clark, & Daniels Inc., Planfield, NJ
[4]Monsanto Co., St. Louis, MO With respect to Applicants' currently available multi-layer golf balls (i.e., "Strata Tour"), the cores of the new balls are substantially smaller (1.42" versus 1.47") and lighter (29.7 grams versus 32.7 grams) have thicker (i.e., 0.075" versus 0.050") and heavier (8.7 grams versus 5.7 grams) inner cover layers. The balls of the present invention produce lower spin and greater distance in comparison with the existing multi-layer golf balls. The difference in physical properties is shown in the table which follows:

| | Strata 100 | Strata 90 |
|---|---|---|
| Core Data | | |
| Size | 1.47" | 1.47" |
| Weight | 32.7 g | 32.7 g |
| Comp (Riehle) | 99 | 106 |

-continued

|  | Strata 100 | Strata 90 |
|---|---|---|
| C.O.R. | .770–.795 | .765–.795 |
| Specific Gravity | 1.209 | 1.209 |
| Hardness (Shore C) | 74–78 | 78–81 |
| Mantle or Inner Layer Data |  |  |
| Size | 1.57 | 1.57 |
| Weight | 38.4 g | 38.4 g |
| Comp (Riehle) | 85 | 85 |
| C.O.R. | .795–.810 | .795–.810 |
| Thickness | 0.050" | 0.050" |
| Hardness (Shore C/D) | 97/70 | 97/70 |
| Specific Gravity | 0.95 | 0.95 |
| Outer Layer Data |  |  |
| Cover Hardness (Shore C/D) | 78/47 | 70/47 |
| Thickness | 0.055" | 0.055" |
| Specific Gravity | 0.97 | 0.97 |
| Final Ball Data |  |  |
| Size | 1.68" | 1.68" |
| Weight | 45.4 g | 45.4 g |
| Comp (Riehle) | 76 | 81 |
| C.O.R. | .785–.810 | .783–.810 |

The resulting golf balls of the present invention (i.e., the "Strata Advance" balls) provide for desirable coefficient of restitution, compression, and durability properties while at the same time offering the feel characteristics associated with soft balata and balata-like covers of the prior art. In addition, the balls spin less and travel farther.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

A number of multi-layer golf balls (solid cores plus inner and outer cover layers) containing metallic particles and/or heavy weight filler additives in the inner cover layer were prepared according to the procedures described above. The moment of inertia (g/cm$^2$) of these balls were compared with commercially available two piece, three piece and other multi-layered balls. The results are set forth in the Tables below.

The cores of the golf balls used in this Example ranged in diameter from 1.42 to 1.47 inches, weighed 26.1 to 32.5 grams, and had a specific gravity of 1.073 to 1.216. These cores were comprised of high cis-polybutadiene, zinc diacrylate, zinc oxide, zinc stearate, peroxide, etc. and were produced according to molding procedures set forth above. Representative formulations of the molded cores (1.42 inches and 1.47 inches) are set forth below in Sample Nos. 20–23 for 1.42 inch cores and Sample No. 23 for 1.47 inch cores.

The above cores exhibited the following general characteristics:

| For Samples No.s 1→16 |  | For Samples No.s 17→19 |  |
|---|---|---|---|
| Size | 1.47" | Size | 1.47" |
| Weight (grams) | 32.7 | Weight (grams) | 32.7 |
| Comp (Riehle) | 100 | Comp (Riehle) | 99 |
| Spec. Grav. | 1.209 |  |  |
| C.O.R. | .763 | C.O.R. | .761 |

The inner thermoplastic cover layer (or mantle layer) used in this Example comprised of a 50%/50% blend of ethylene acrylic acid ionomer resins, i.e., Iotek 1002 and Iotek 1003. These ionomers exhibit the characteristics generally defined above.

A series of golf balls were formulated with inner cover layers containing 5 phr of various metal particles or heavy weight fillers and 47.5% Iotek 1002 and 47.5% Iotek 1003. Two (2) control balls were also produced (Sample Nos. 14 and 15 below) containing no fillers (i.e., 50% Iotek 1002 and 50% Iotek 1003). The general properties of the balls were measured according to the following perimeters:

PGA Compression

PGA compression is an important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact a hard core serves to compress the cover of the ball against the face of the club to a much greater degree than a soft core thereby resulting in more "grab" of the ball on the clubface and subsequent higher spin rates. In effect the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multi-layer solid core balls exhibit much more consistent compression readings than balls having wound cores such as the thread wound three-piece balls.

In the past, PGA compression related to a scale of from 0 to 200 given to a golf ball. The lower the PGA compression value, the softer the feel of the ball upon striking. In practice, tournament quality balls have compression ratings around 70–110, preferably around 80 to 100.

In determining PGA compression using the 0–200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–110).

In order to assist in the determination of compression, several devices have been employed by the industry. For example, PGA compression is determined by an apparatus fashioned in the form of a small press with an upper and lower anvil. The upper anvil is at rest against a 200-pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the springloaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle Bros. Testing Machine Company, Phil., Pa. to evaluate compression of the various components (i.e., cores, mantle cover balls, finished balls, etc.) of the golf balls. The Riehle compression device determines deformation in thousandths of an inch under a load designed to emulate the 200 pound spring constant of the Atti or PGA compression device. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160−Riehle compression. Consequently, 80 Riehle compression corresponds to 80 PGA compression, 70 Riehle compression corresponds to 90 PGA compression, and 60 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is know. These devices have been designed, such as a Whitney Tester, to correlate or correspond to PGA compression through a set relationship or formula.

Coefficient of Restitution

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36" and are located 25.25" and 61.25" from the rebound wall. The ball speed was measured by timing the pulses from screen 1 to screen 2 on the way into the rebound wall (as the average speed of the ball over 36"), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Shore D Hardness

As used herein, "Shore D hardness" of a cover layer is measured generally in accordance with ASTM D-2240, except the measurements are made on the curved surface of a molded cover layer, rather than on a plaque. Furthermore, the Shore D hardness of the cover layer is measured while the cover layer remains over the core and any underlying cover layers. When a hardness measurement is made on a dimpled cover, Shore D hardness is measured, to the best extent possible, at a land area of the dimpled cover.

The following properties were noted:

| Sample No. | Additive to Mantle | SIZE | | WEIGHT | | COMP. (RIEHLE) | | C.O.R. | |
|---|---|---|---|---|---|---|---|---|---|
| | | Center & Mantle | Molded Cover | Center & Mantle | Molded Cover | Center & Mantle | Molded Cover | Center & Mantle | Molded Cover |
| 1 | Bismuth Powder | 1.573 | 1.686 | 38.8 | 45.89 | 84 | 79 | 0.7921 | 0.7765 |
| 2 | Boron Powder | 1.574 | 1.686 | 38.8 | 45.79 | 83 | 79 | 0.7943 | 0.7754 |
| 3 | Brass Powder | 1.575 | 1.686 | 38.9 | 45.9 | 84 | 80 | 0.7944 | 0.7757 |
| 4 | Bronze Powder | 1.573 | 1.686 | 38.8 | 45.89 | 84 | 80 | 0.7936 | 0.7770 |
| 5 | Cobalt Powder | 1.573 | 1.686 | 38.9 | 45.88 | 82 | 79 | 0.7948 | 0.7775 |
| 6 | Copper Powder | 1.574 | 1.686 | 38.9 | 45.9 | 84 | 80 | 0.7932 | 0.7762 |
| 7 | Inconnel Metal Powder | 1.574 | 1.687 | 39.0 | 45.94 | 83 | 80 | 0.7926 | 0.7757 |
| 8 | Iron Powder | 1.575 | 1.686 | 38.9 | 45.98 | 83 | 79 | 0.7928 | 0.7759 |
| 9 | Molybdenum Powder | 1.575 | 1.686 | 38.9 | 45.96 | 84 | 80 | 0.7919 | 0.7765 |
| 10 | Nickel Powder | 1.574 | 1.686 | 38.9 | 45.96 | 85 | 79 | 0.37917 | 0.7753 |
| 11 | Stainless Steel Powder | 1.574 | 1.687 | 38.9 | 45.92 | 86 | 78 | 0.7924 | 0.7757 |
| 12 | Titanium Metal Powder | 1.574 | 1.687 | 39.0 | 45.92 | 84 | 79 | 0.7906 | 0.7746 |
| 13 | Zirconium Oxide Powder | 1.575 | 1.686 | 38.9 | 45.92 | 85 | 80 | 0.7920 | 0.7761 |
| 14 | Control | 1.574 | 1.686 | 38.5 | 45.63 | 86 | 80 | 0.7925 | 0.7771 |
| 15 | Aluminum Flakes | 1.575 | 1.687 | 39.0 | 45.91 | 84 | 77 | 0.7830 | 0.7685 |
| 16 | Aluminum Tadpoles | 1.576 | 1.687 | 39.0 | 45.96 | 83 | 78 | 0.7876 | 0.7717 |
| 17 | Aluminum Flakes | 1.576 | 1.686 | 38.9 | 45.92 | 80 | 77 | 0.7829 | 0.7676 |
| 18 | Carbon Fibers | 1.576 | 1.687 | 38.9 | 45.88 | 79 | 74 | 0.7784 | 0.7633 |
| 19 | Control | 1.576 | 1.687 | 38.7 | 45.74 | 82 | 79 | 0.7880 | 0.7737 |

In addition to the samples produced above, a number of further samples were produced wherein the size and weight of the cores were reduced and the thickness and weight of the inner cover layers were increased. This can be seen in Sample Nos. 20–23 (below) when the following formulations were utilized.

| | SAMPLE NOS. | | | | |
|---|---|---|---|---|---|
| | 20 | 21 | 22 | 23a | 23 |
| Core Data | | | | | |
| Cariflex 1220 | 70 | 70 | 70 | 70 | 70 |
| Taktene 220 | 30 | 30 | 30 | 30 | 30 |
| Zinc Oxide | 34 | 20 | 6 | 31.5 | 34 |

-continued

|  | SAMPLE NOS. | | | | |
|---|---|---|---|---|---|
|  | 20 | 21 | 22 | 23a | 23 |
| TG Regrind | 20 | 20 | 20 | 16 | 20 |
| Zinc Diacrylate (ZDA) | 17.5 | 18 | 18.5 | 20 | 17.5 |
| Zinc Stearate | 15 | 15 | 15 | 16 | 15 |
| 231 XL Peroxide | 0.9 | 0.9 | 0.9 | 0.9 | 0.9 |
| Color | Pink | Blue | Orange | Green | Pink |
| Size (inches) | 1.42 | 1.42 | 1.42 | 1.47 | 1.42 |
| Weight (grams) | 29.4 | 27.9 | 26.1 | 32.5 | 29.4 |
| S.G. | 1.216 | 1.146 | 1.073 | 1.209 | 1.216 |
| Comp. (Riehle) | 130 | 128 | 130 | 106 | 130 |
| C.O.R. | .757 | .767 | .772 | .765 | .757 |
| Mantle Data |  |  |  |  |  |
| Iotek 1002 | 50 | 50 | 50 | 50 | 50 |
| Iotek 1003 | 50 | 50 | 50 | 50 | 50 |
| Tungsten | 4 | 26.2 | 51 | — | 4 |
| Thickness | 0.075" | 0.075" | 0.075" | 0.050" | 0.075" |
| S.G. | 0.98 | 1.19 | 1.405 | 0.96 | 0.98 |
| Weight (grams) | 38.3 | 38.2 | 38.5 | 38.5 | 38.2 |
| Comp. (Riehle) | 92 | 93 | 91 | 86 | 92 |
| C.O.R. | 797 | 801 | 804 | 797 | 797 |
| Ball Data |  |  |  |  |  |
| Cover Material | Iotek 8000 19%<br>Iotek 7030 19%<br>Iotek 7520 52.4%<br>2810 MB 9.56% | Iotek 8000 19%<br>Iotek 7030 19%<br>Iotek 7520 52.4%<br>2810 MB 9.56% | Iotek 8000 19%<br>Iotek 7030 19%<br>Iotek 7520 52.4%<br>2810 MB 9.56% | Iotek 8000 19%<br>Iotek 7030 19%<br>Iotek 7520 52.4%<br>2810 MB 9.56% | Iotek 7510 42%<br>Iotek 7520 42%<br>Iotek 8000 8.7%<br>Iotek 7030 7.3% |
| Dimple | 422 Tri | 422 Tri | 422 Tri | 422 Tri | 422 Tri |
| Size (inches) | 1.684 | 1.684 | 1.685 | 1.684 | 1.686 |
| Weight (grams) | 45.4 | 45.5 | 45.6 | 45.8 | 45.5 |
| Comp (Riehle) | 82 | 73 | 83 | 81 | 85 |
| C.O.R. | .789 | .791 | .791 | .788 | .781 |
| Shore D | 57 | 57 | 57 | 57 | 48 |

The moment of inertia characteristic of the balls utilized in this Example (i.e., the balls of the invention and commercially available balls) was measured using Moment of Inertia Measuring Instrument Model 5050 made by Inertia Dynamics of Wallingford, Conn. It consists of a horizontal pendulum with a top-mounted cage to hold the ball. The period of oscillation of the pendulum back and forth is a measure of the moment of inertia of the item in the cage. The machine is calibrated using known objects (sphere, cylinder) whose moments are easily calculated or are known.

Actual use of the instrument is as follows. The pendulum is swung with the cage empty. This determines the moment of the machine, less any objects. The ball to be tested is then placed in the cage and the pendulum is swung again. The period of oscillation will be longer, as the moment of inertia is greater with the ball in the device.

The two periods are used to calculate the moment of inertia of the ball, using the formula:

$$I = 194.0 * (t^2 - T^2)$$

where the 194.0 is the calibration constant for the machine, the T is the period of oscillation of the empty instrument, and t is the period of oscillation of the instrument with the ball loaded.

The following results were obtained:

| Ball Type | Sample # | Core Size | Mantle | Additive | phr | Moment of Inertia | Ball Size |
|---|---|---|---|---|---|---|---|
| Multi-Layer | 1 | 1.47 | Iotek 1002/1003 | Bismuth | 5 | 0.447 | 1.68 |
| Multi-Layer | 2 | 1.47 | Iotek 1002/1003 | Boron | 5 | 0.443 | 1.68 |
| Multi-Layer | 3 | 1.47 | Iotek 1002/1003 | Brass | 5 | 0.449 | 1.68 |
| Multi-Layer | 4 | 1.47 | Iotek 1002/1003 | Bronze | 5 | 0.446 | 1.68 |
| Multi-Layer | 5 | 1.47 | Iotek 1002/1003 | Cobalt | 5 | 0.449 | 1.68 |
| Multi-Layer | 6 | 1.47 | Iotek 1002/1003 | Copper | 5 | 0.447 | 1.68 |
| Multi-Layer | 7 | 1.47 | Iotek 1002/1003 | Inconnel | 5 | 0.450 | 1.68 |
| Multi-Layer | 8 | 1.47 | Iotek 1002/1003 | Iron | 5 | 0.450 | 1.68 |
| Multi-Layer | 9 | 1.47 | Iotek 1002/1003 | Molybdenum | 5 | 0.448 | 1.68 |
| Multi-Layer | 10 | 1.47 | Iotek 1002/1003 | Nickel | 5 | 0.452 | 1.68 |
| Multi-Layer | 11 | 1.47 | Iotek 1002/1003 | Stainless Steel | 5 | 0.451 | 1.68 |
| Multi-Layer | 12 | 1.47 | Iotek 1002/1003 | Titanium | 5 | 0.447 | 1.68 |
| Multi-Layer | 13 | 1.47 | Iotek 1002/1003 | Zirconium Oxide | 5 | 0.448 | 1.68 |
| Multi-Layer | 14 | 1.47 | Iotek 1002/1003 | None (control) | 0 | 0.441 | 1.68 |

-continued

| Ball Type | Sample # | Core Size | Mantle | Additive | phr | Moment of Inertia | Ball Size |
|---|---|---|---|---|---|---|---|
| Multi-Layer | 15 | 1.47 | Iotek 1002/1003 | Aluminum Flakes | 5 | 0.449 | 1.68 |
| Multi-Layer | 16 | 1.47 | Iotek 1002/1003 | Aluminum Tadpoles | 5 | 0.443 | 1.68 |
| Multi-Layer | 17 | 1.47 | Iotek 1002/1003 | Aluminum Flakes | 5 | 0.446 | 1.68 |
| Multi-Layer | 18 | 1.47 | Iotek 1002/1003 | Carbon Fibers | 5 | 0.443 | 1.68 |
| Multi-Layer | 19 | 1.47 | Iotek 1002/1003 | None (control) | 0 | 0.442 | 1.68 |
| Multi-Layer | 20 | 1.42 | Iotek 1002/1003 | Tungsten | 4 | 0.436 | 1.68 |
| Multi-Layer | 21 | 1.42 | Iotek 1002/1003 | Tungsten | 26.2 | 0.450 | 1.68 |
| Multi-Layer | 22 | 1.42 | Iotek 1002/1003 | Tungsten | 51 | 0.460 | 1.68 |
| Multi-Layer | 23 | 1.47 | Iotek 1002/1003 | non (control) | 0 | 0.441 | 1.68 |
|  | Strata Tour | 1.47 | Hard Ionomer | none | 0 | 0.444 | 1.68 |
|  | Precept Dynawing DC | 1.44 | Soft Ionomer | Unknown | — | 0.433 | 1.68 |
| Multi-Layer | Wilson Ultra Tour Balata | 1.52 | Hard Ionomer | TiO2 (as Colorant) | Low | 0.453 | 1.68 |
| Multi-Layer 3 Piece | Precept Tour DC | Wound | Hard Ionomer | TiO2 (as Colorant) | Low | 0.405 | 1.68 |
| 3-Piece | Titleist Tour Balata | Wound | None | — | — | 0.407 | 1.68 |
| 3-Piece | Titleist Tour Balata | Wound | None | — | — | 0.412 | 1.68 |
| 2-Piece | Top Flite XL | 1.545 | None | — | — | 0.445 | 1.68 |
| 2-Piece | Top Flite Z-Balata | 1.545 | None | — | — | 0.448 | 1.68 |
| 2-Piece Oversize | Top Flite Magna | 1.545 | None | — | — | 0.465 | 1.72 |
| 2-Piece Oversize | Top Flite Magna EX | 1.57 | None | — | — | 0.463 | 1.72 |

The above results demonstrate that the inclusion of metal particles or other heavy weight filler materials in the inner cover layer produces a higher moment of inertia than the same ball without the materials. This can be seen in comparing Sample Nos. 14 and 19 containing no metal particles in the inner cover layer with Sample Nos. 1–13 and 15–18 containing such heavy weight fillers.

Moreover, as shown in Sample Nos. 20–23, the level of heavy filler present in the inner cover layer is related to the increase in the moment of inertia of the balls. In this regard, Sample No. 20 has 4 parts of tungsten filler compared to the 26.2 and 51 parts found in Sample Nos. 21 and 22, respectively, and the moment of inertia increased accordingly with the filler level.

EXAMPLE 2

A number of golf balls were produced in order to evaluate the effectiveness of transferring the weight of a golf ball from the central core to the inner cover layer. In this regard, four (4) different core formulations (i.e., Core Formulations A–D) were produced wherein the weight in two of the cores, i.e., Core Formulations C and D, was reduced. These formulations were compared to Core Formulation E, the core currently utilized in Spalding's two-piece Top-Flite Z-Balata 100 production ball.

| | Core Formulations | | | | |
|---|---|---|---|---|---|
| | A | B | C | D | E |
| Materials | | | | | |
| Cariflex 1220 | 70 | 70 | 70 | 70 | 70 |
| Taktene 220 | 30 | 30 | 30 | 30 | 30 |
| Zinc Oxide | 26.7 | 25 | 5 | 5 | 18 |
| Zinc Stearate | 0 | 0 | 0 | 0 | 20 |
| Zinc Diacrylate (ZDA) | 22.5 | 24 | 24 | 22.5 | 29.7 |
| Stearic Acid | 2 | 2 | 2 | 2 | 0 |
| TG Regrind | 16 | 16 | 16 | 16 | 10.4 |
| 231 XL Peroxide | 0.9 | 0.9 | 0.9 | 0.9 | 0.9 |
| Properties | | | | | |
| Size (inches) | 1.47" | 1.47" | 1.47" | 1.47" | 1.47" |
| Specific Gravity | 1.19 | 1.17 | 1.07 | 1.07 | 1.15 |

-continued

| | Core Formulations | | | | |
|---|---|---|---|---|---|
| | A | B | C | D | E |
| Weight (grams) | 34.4 | 31.8 | 29.1 | 29.3 | 38.1 |
| Compression (Riehle) | 106 | 83 | 91 | 114 | 78 |
| C.O.R. | .771 | .789 | .790 | .774 | .799 |

As shown above, the weight and/or specific gravity of the core can be decreased (i.e., compare Core Formulations C and D with Core Formulations B and A) without substantially effecting the C.O.R. values of the core. In turn, the effectiveness of increasing the weight of the inner cover layer (or mantle) was evaluated by adding a heavy filler material such as tungsten powder to the inner cover (mantle) formulations. This is shown in the mantle and cover formulations set forth below.

| | Mantle and Cover Formulations | | | |
|---|---|---|---|---|
| Materials | 1 | 2 | 3 | 4 |
| Iotek 8000 | 50 | 50 | — | 33 |
| Iotek 7030 | 50 | 50 | — | — |
| Iotek 959 | — | — | 50 | — |
| Iotek 960 | — | — | 50 | — |
| Iotek 7510 | — | — | — | 57.5 |
| TG White MB | — | — | — | 9.5 |
| Tungsten Powder | — | 62.5 | 80 | — |
| Zinc Stearate | — | — | 50 | — |

The finished ball properties of the various combinations of core, mantle and outer cover formulations are as follows:

|  | Sample #24 | Sample #25 | Sample #26 | Sample #27 | Sample #28 | Sample #29 | Sample #30 | Sample #31 |
|---|---|---|---|---|---|---|---|---|
| Core Data |  |  |  |  |  |  |  |  |
| Type | A | B | C | D | C | D | D | E |
| Size | 1.47" | 1.47" | 1.47" | 1.47" | 1.47" | 1.47" | 1.47" | 1.57" |
| S.G. | 1.19 | 1.17 | 1.07 | 1.07 | 1.07 | 1.07 | 1.07 | 1.15 |
| Weight | 32.4 | 31.8 | 29.1 | 29.3 | 29.1 | 29.3 | 29.3 | 38.1 |
| Comp. | 106 | 83 | 91 | 114 | 91 | 114 | 114 | 78 |
| C.O.R. | .771 | .789 | .790 | .774 | .790 | .774 | .774 | .799 |
| Mantle Data |  |  |  |  |  |  |  |  |
| Mantle Formulation | 1 | 1 | 1 | 1 | 2 | 2 | 3 | — |
| Size | 1.57 | 1.57 | 1.57 | 1.57 | 1.57 | 1.57 | 1.57 | — |
| S.G. | 0.95 | 0.95 | 0.95 | 0.95 | 1.53 | 1.53 | 1.5 | — |
| Weight | 37.8 | 37.6 | 34.8 | 34.7 | 37.8 | 37.7 | 37.4 | — |
| Comp. | 93 | 77 | 83 | 100 | 83 | 100 | 99 | — |
| C.O.R. | .793 | .804 | .810 | .801 | .806 | .795 | .716–.802 | — |
| Finished Ball Data |  |  |  |  |  |  |  |  |
| Cover Formulation | 4 | 4 | 4 | 4 | 4 | 4 | 4 | 4 |
| Size | 1.681 | 1.681 | 1.682 | 1.682 | 1.681 | 1.681 | 1.681 | 1.682 |
| S.G. | 0.97 | 0.97 | 0.97 | 0.97 | 0.97 | 0.97 | 0.97 | 0.97 |
| Weight | 45 | 44.8 | 41.9 | 41.8 | 45.1 | 44.8 | 44.5 | 45.4 |
| Comp. | 80 | 69 | 74 | 86 | 74 | 84 | 83 | 76 |
| C.O.R. | .787 | .801 | .806 | .787 | .799 | .790 | .787 | .802 |
| Moment of Inertia | 0.433834 | 0.431195 | Not Tested | Not Tested | 0454017 | 0.449169 | Not Tested | 0.444149 |

The results indicate that the displacement of weight from the core to the mantle or inner cover layer enhances the moment of inertia of the balls. This is demonstrated particularly in comparing Sample Nos. 24–25 with Sample Nos. 28–30. Accordingly, the formulation of a lighter core with a heavier inner cover or mantle layer produces a ball having an increased moment of inertia.

EXAMPLE 3

Two multi-layer golf balls having relatively thick (about 0.075") inner cover layers (or mantles) containing about ten percent (10%) of powdered brass (Zinc Corp. of America, Monica, Pa.) were prepared and the moment of inertia property of the balls was evaluated. Different solid polybutadiene cores of the same size (i.e., 1.42"), weight (29.7 g) and specific gravity (i.e., 1.2) were utilized but the cores different with respect to compression (Riehle) and C.O.R. The two multi-layer golf balls produced had is the following cover properties.

| Formulations | Sample #32 | Sample #33 |
|---|---|---|
| Cariflex 1220 (High Cis-polybutadiene) | 70 | 70 |
| Taktene 220 (High Cis-polybutadiene) | 30 | 30 |
| Zinc Oxide | 31 | 30.5 |
| TG Regrind (Core regrind) | 20 | 20 |

| | Sample #32 | Sample #33 |
|---|---|---|
| Zinc Diaxylate | 17.5 | 18.5 |
| Zinc Stearate | 15 | 15 |
| 231 XL Peroxide | 0.9 | 0.9 |
| Core Data | | |
| Size | 1.42" | 1.42" |
| Weight (grams) | 29.7 | 29.7 |

-continued

| | Sample #32 | Sample #33 |
|---|---|---|
| Comp (Riehle) | 124 | 117 |
| C.O.R. | .765 | .770 |
| Spec. Grav. | 1.2 | 1.2 |

| Formulations | Modulus | Spec. Grav. | Sample #32 | Sample #33 |
|---|---|---|---|---|
| Iotek 1002 | 380 MPa | 0.95 | 45 | 45 |
| Iotek 1003 | 147 MPa | 0.95 | 45 | 45 |
| Powdered Brass | — | 8.5 | 10 | 10 |
| Blend Modulus (Estimated) |  |  | 264 MPa | 264 MPa |
| Spec. Grav. Blend |  |  | 1.05 | 1.05 |
| Mantle Data |  |  |  |  |
| Size |  |  | 1.57" | 1.57" |
| Thickness |  |  | 0.075" | 0.075" |
| Weight (grams) |  |  | 38.4 | 38.4 |
| Comp (Riehle) |  |  | 92 | 84 |
| C.O.R. |  |  | .795 | .800 |
| Shore C/D |  |  | 97/70 | 97/70 |

| Formulations | Modulus | Sample #32 | Sample #33 |
|---|---|---|---|
| Iotek 7510 | 35 MPa | 58.9 | 58.9 |
| Iotek 8000 | 320 MPa | 33.8 | 33.8 |
| Iotek 7030 | 155 MPa | 7.3 | 7.3 |
| Blend Modulus (Estimated) |  | 140 MPa | 140 MPa |
| Spec. Grav. Blend Whitener Package |  | 0.98 | 0.98 |
| Unitane 0–110 |  | 2.3 phr | 2.3 phr |
| Eastobrite OB-1 |  | 0.025 phr | 0.025 phr |
| Ultra Marine Blue |  | 0.042 phr | 0.042 phr |
| Santonox R |  | 0.004 phr | 0.004 phr |

-continued

| Formulations | Modulus | Sample #32 | Sample #33 |
|---|---|---|---|
| Ball Data | | | |
| Size | | 1.68" | 1.68" |
| Cover Thickness | | 0.055" | 0.055" |
| Weight | | 45.5 | 45.5 |
| Comp (Riehle) | | 80 | 76 |
| C.O.R. | | .785 | .790 |
| Shore C/D | | 87/56 | 87/56 |
| Moment of Inertia | | 0.445 | 0.445 |

The above multi-layer balls of the present invention having a thick inner cover layer (or mantle) comprising a blend of high acid ionomer resins and about 10% of a heavy weight filler material over a soft cross-linked polybutadiene core with a cover layer of soft thermoplastic material, exhibited an increased moment of inertia. This can be seen by comparing the moment of inertia of the control balls of Example 1 (i.e., Sample Nos. 14, 19 and 23) which possessed a moment of inertia of approximately 0.441 and the balls of the invention above (i.e., Sample Nos. 32–33) which exhibited a moment of inertia of 0.445.

EXAMPLE 4

The effects produced by increasing the moment of inertia and increasing the inner cover layer thickness of a multi-layer golf ball was observed by comparing a multi-layer golf ball produced by the present invention (i.e., "Strata Distance 90-EX") with a commercially available multi-layer golf ball sold by Spalding under the designation "Strata Tour 90". The "Strata Distance 90-EX" ball contains a thick high acid ionomer resin inner cover layer over a soft cross-linked polybutadiene core with an outer cover layer of soft ionomer resin. Further, the mantle or inner cover layer is filled with 5 phr of powdered tungsten.

In addition, the spin and distance characteristics of the multi-layer golf balls were also compared with Spalding's "Top-Flite Z-Balata 90" golf ball (a 1.68", two-piece ball having a soft ionomer resin cover) and Acushnet Company's "Titleist Tour Balata 100" golf ball (a 1.68", two-piece ball having a soft synthetic balata cover). The distance and spin characteristics were determined according to the following parameters:

Three balls of each type being tested are checked for static data to insure they are within reasonable limits individually for size, weight, compression and coefficient. They must, at the least, be reasonably similar to one another for static data.

A stripe is placed around a great circle of the ball to create a visual equator which is used to measure the spin rate in the photographs. The balls are hit a minimum of three times each ball, so that for a given type, there will be nine hits to yield information on the launch angle, ball speed and spin rate. Further, the balls are hit in random order to randomize effects due to machine variations.

A strobe light is used to produce up to 10 images of the ball's flight on Polaroid film. The strobe is controlled by a computer based counter timer board running with a clock rate of 100,000 Hertz. This means that the strobed images of the ball are known in time to within $1/100,000$ second.

In each picture, in the field of view, is a reference system giving a level line reference and a length reference. Each picture is digitized on a 1000 lines per inch resolution digitizing tablet, giving positions of the reference and the stripes on the multiple images of the balls. From this information, the ball speed, launch angle and spin rate can be obtained.

A #9 iron with the following specifications is used for the test: 1984 Tour Edition Custom Crafted 9 Iron with V grooves, 140 pitch. The shaft is a Dynamic Gold R3. The club has a D2.0 swing weight, length of 35 ⅞ inches, lie of 62 degrees, with face angle at 0, the loft is 47 ½ degrees. The club's overall weight is 453 grams. The grip is an Eaton Green Victory M60 core grip.

The club is held in the "wrist" mechanism of the Miya Epoch Robo III Driving Machine so that the machine will strike the ball squarely, driving the ball straight away from the tee in line with the swing of the club. The machine is manufactured by Miya Epoch of America, Inc., 2468 W. Torrance Blvd., Torrance, Calif. 90501. A line is drawn along the base of the machine, extending out along the direction of the hit ball. The ball impacts a stopping curtain of Kevlar 8–10 feet downrange, and a square shot is one in which the direction of the ball from the tee is parallel to the line drawn along the front base of the driving machine. Average ball speed of all types together should be around 100–125 feet per second, and launch angle should be around 26 to 34 degrees.

| Test Conditions: (test #92461) | |
|---|---|
| Club: 10 Degree Driver | Ball Speed: 227.1 fps |
| Club Head Speed: 16 fps | Spin Rate: 3033 rpm |
| Launch angle: 9.1 | Turf Conditions: Firm |

| | Distance Results | | | | Spin Results(rpm) | |
| | | | | | 9 Iron | 9 Iron |
|---|---|---|---|---|---|---|
| Ball Type | Traj. | Carry | Roll | Total | @ 125 fps | @ 63 fps |
| Strata Tour 90 | 15 | 250.7 | 5.2 | 255.8 | 9273 | 5029 |
| Z-Balata 90 | 15.1 | 250.6 | 1.3 | 255.4 | 9314 | 4405 |
| Strata Distance 90-EX | 15.5 | 254.4 | 1.4 | 258.1 | 9033 | 4308 |
| Titleist Tour Balata 100 | 14.8 | 247.6 | 0.7 | 250.7 | 10213 | 4978 |

The results indicate that the increase produced in the moment of inertia by enlarging the thickness and weight of the inner cover layer while reducing the weight and size of the core resulted in a multi-layer ball (i.e., the Strata Distance 90-EX) having less spin and farther distance than the existing multi-layer golf ball (i.e., Strata Tour 90). Furthermore, the results indicate that the ball of the present invention traveled farther than other commercially available high spinning golf balls.

EXAMPLE 5

An additional embodiment according to the present invention utilizes blends of the Neo Cis polymers in the core compositions. The following Table represents core formulations which utilizes a blend of Neo Cis 40 and Neo Cis 60 with Cariflex BCP-820 (amounts of ingredients are in parts per hundred rubber (phr) based on 100 parts butadiene rubber):

TABLE I

| Ingredient | 1 | 2 |
| --- | --- | --- |
| Cariflex BCP-820 | 40 | 40 |
| Neo Cis 60 | 30 | 30 |
| Neo Cis 40 | 30 | 30 |
| Zinc Oxide | 26 | 24.6 |
| Zinc Stearate | 16 | 16 |
| ZDA | 18.2 | 19.6 |
| Yellow MB | — | — |
| Green MB | — | — |
| Black MB | — | — |
| Red MB | 0.075 | 0.075 |
| Blue MB | 0.075 | 0.075 |
| Triganox 42-40B | 1.25 | 1.25 |

The core formulations set forth above in Table I were then utilized to produce the following corresponding cores:

TABLE II

| Property | 1 | 2 |
| --- | --- | --- |
| Size (pole dia. inches) | 1.47" ± 0.004 | 1.47" ± 0.004 |
| Weight (grams) | 31.5 ± 0.3 | 31.5 ± 0.3 |
| Riehle Comp. | 145 ± 8 | 135 ± 8 |
| C.O.R. | 0.760 ± 0.015 | 0.770 ± 0.015 |
| Specific Gravity | 1.168 | 1.168 |
| JIS C | 70 ± 2 | 71 ± 2 |
| Shore C | 10 ± 2 | 71 ± 2 |
| Shore D | 41 ± 2 | 42 ± 2 |

In a preferred embodiment, the cores utilizing the blend of Neo Cis 40 and Neo Cis 60 have a mantle or inner cover layer formed thereon. A variety of ionomers may be utilized in the mantle or inner cover layer of the multi-layer golf balls according to the present invention. Ionomeric resins such as those designated as Surlyn®, manufactured by DuPont, and Iotek, manufactured by Exxon, are suitable for forming the mantle layer, but any polymer conventionally used to form inner cover layers in the multi-layer golf balls can be used. The following Table III includes ionomers which are exemplary of specific ionomers which may be utilized in the inner cover layer of multi-layer balls according to the present invention. These examples are not intended to be limiting of the specific ionomers which can be used.

TABLE III

| | Individual Ionomers | | |
| --- | --- | --- | --- |
| | Iotek 1002 | Iotek 1003 | Surlyn ® 8552 |
| % Acid Type | 18% AA | 18% AA | 19% MA |
| Ionomer Type | Copolymer | Copolymer | Copolymer |
| Cation | Na | Zn | Mg |

TABLE III-continued

| | Individual Ionomers | | |
| --- | --- | --- | --- |
| | Iotek 1002 | Iotek 1003 | Surlyn ® 8552 |
| Melt Index | 2 | 1 | 1.3 |
| Stiffness Modulus *2 | 4053 MPa | 1873 MPa | 3499 Kgf/cm$^2$ |

AA = Acrylic Acid;
MA = Methacrylic Acid
*2 Stiffness measurements done using Toyoseiki Stiffness Tester The mantle layer contains heavy weight fillers including bronze, brass, tungsten, and the like.

The following represents various intermediate golf balls formed from the cores of Table II.

TABLE IV

| | Intermediate Ball with Inner Cover | |
| --- | --- | --- |
| | 1 | 2 |
| Core Formulation (From Table II) | 1 | 2 |
| Mantle Composition (Wt %) | | |
| Iotek 1002 (Na) | 35% | 35% |
| Iotek 1003 (Zn) | — | — |
| Surlyn 8552 (Ma) | 65% | 65% |
| Filler (Bronze Powder) | 19.0 pph | 19.0 pph |
| TiO$_2$ | 0.1 pph | 0.1 pph |

The inner cover layers, or mantles, as set forth in Table IV above have the following characteristics as shown in Table V below:

TABLE V

| Property | 1 | 2 |
| --- | --- | --- |
| Flex Modulus (weighted avg.) | 264 MPa | 264 MPa |
| Stiffness Modulus | 3521 Kgf/cm$^2$ | 3521 Kgf/cm$^2$ |
| Size (intermediate ball) | 1.570" ± 0.004 | 1.570" ± 0.004 |
| Weight (intermediate ball) | 38.3 g ± 0.3 | 38.3 g ± 0.3 |
| Thickness | 0.050" ± 0.008 | 0.050" ± 0.008 |
| Riehle Comp | 112 ± 12 | 106 ± 8 |
| C.O.R. | 0.790 ± 0.015 | 0.795 ± 0.015 |
| Mantle Specific Gravity | 1.12 ± 0.05 | 1.12 ± 0.05 |
| JIS C | 97 ± 1 | 97 ± 1 |
| Shore C | 97 ± 1 | 97 ± 1 |
| Shore D | 70 ± 1 | 70 ± 1 |

The intermediate balls, as shown in Table IV were then formed into finished golf balls by covering them with an outer cover formulation. The covers are typically ionomeric but other polymers may be utilized in the covers as set forth herein before. Ionomers typically associated with the golf balls according to the present invention include those designated as Surlyn®, manufactured by DuPont, and Iotek, manufactured by Exxon. The ionomers may be used individually or in blends. The following Table VI includes ionomers which are exemplary of specific ionomers that may be utilized for the outer cover layer of golf balls according to the present invention.

TABLE VI

| | \multicolumn{9}{c|}{Outer Cover Ionomers} |
| --- | --- | --- | --- | --- | --- | --- | --- | --- | --- |
| | Surlyn 8940 | Surlyn 9910 | Surlyn 8320 | Surlyn 8120 | Surlyn 8549 | Iotek 7030 | Iotek 7510 | Iotek 7520 | Iotek 8000 |
| % Acid Type | 15% MA | 15% MA | ~7% MA | ~7% MA | 15% MA | 15% AA | 6% AA | 6% AA | 15% AA |
| Ionomer Type | Copolymer | Copolymer | Terpolymer | Terpolymer | Copolymer | Copolymer | Terpolymer | Terpolymer | Copolymer |
| Cation | Na | Zn | Na | Na | Na | Zn | Zn | Zn | Na |
| Melt Index | 2.8 | 0.7 | 0.8 | 2 | 2.3 | 2.5 | 0.8 | 2 | 2 |
| Stiffness Modulus *2 | 2705 Kgf/cm$^2$ | 2874 Kgf/cm$^2$ | 168 Kgf/cm$^2$ | 492 Kgf/cm$^2$ | — | 1840 Kgf/cm$^2$ | 284 Kgf/cm$^2$ | 270 MPa | 3323 Kgf/cm$^2$ |

AA = Acrylic Acid;
MA = Methacrylic Acid
*2 Stiffness measurements done using Toyoseiki Stiffness Tester The intermediate golf balls of Table IV were then covered with cover formulations to produce the following finished golf balls:

TABLE VII

| Finished Ball | A | B |
| --- | --- | --- |
| Intermediate Ball (from Table IV) | 1 | 2 |
| Cover Composition (wt %) | | |
| Surlyn 8549 (Na) | — | — |
| Iotek 7510 (Zn) | — | 58.9% |
| Iotek 7520 (Zn) | — | — |
| Surlyn 8940 (Na) | 17% | — |
| Surlyn 9910 (Zn) | 50.1% | — |
| Surlyn 8320 (Na) | 17.9% | — |
| Surlyn 8120 (Na) | 7.7% | — |
| Iotek 7030 (Zn) | 7.3% | 7.3% |
| Iotek 8000 (Na) | — | 33.8% |
| Whitener (TiO$_2$)* | 2.3 phr | 2.3 phr |

*Amount based on parts per hundred resin

The finished balls of Table VII above had the following characteristics:

TABLE VIII

| Property | A | B |
| --- | --- | --- |
| Flex Modulus (weighted avg.) | 240 Mpa | 140 MPa |
| Stiffness Modulus (estimate) | 1820 Kgf/cm$^2$ | 763 Kgf/cm$^2$ |
| Combined Mantle/Cover Stiffness | 1942 Kgf/cm$^2$ | — |
| Cover Specific Gravity | 0.98 ± 0.01 | 0.98 ± 0.01 |
| Size | 1.685" ± 0.005 | 1.685" ± 0.005 |
| Weight | 45.4 g ± 0.4 | 45.4 g ± 0.4 |
| Riehle Compression | 95 ± 5 | 85 ± 5 |
| C.O.R. | 0.790 ± 0.015 | 0.790 ± 0.015 |
| JIS C | 93 ± 1 | 87 ± 1 |
| Shore C | 93 ± 1 | 87 ± 1 |
| Shore D | 62 ± 1 | 56 ± 1 |

The invention has been described With reference to the preferred embodiment. Obviously, modifications and alterations will occur to others upon reading and understanding the proceeding detailed description. It is intended that the invention be construed as including all such modifications and alterations insofar as they come within the scope of the appended claims or the equivalents thereof.

Having thus described the invention, it is claimed:

1. A golf ball comprising:
   a core including (i) a first polybutadiene rubber obtained utilizing a cobalt catalyst and having a Mooney viscosity in the range of from about 70 to about 83, and (ii) a blend of polybutadiene rubbers wherein each is obtained by utilizing a lanthanide series catalyst and having a Mooney viscosity of from about 30 to about 70;
   a cover disposed about said core, said cover comprising an inner cover layer and an outer layer cover, said inner cover layer comprising a heavy weight filler.

2. The multi-layer golf ball of claim 1, said inner and outer cover layers are comprised of ionomer resins.

3. The multi-layer golf ball of claim 1, wherein said inner cover layer is comprised of at least one ionomer resin having an acid content greater than 16 weight percent.

4. The multi-layer golf ball of claim 1, where said inner cover layer is comprised of at least one ionomer resin having an acid content of 18 weight percent or more.

5. The multi-layer golf ball of claim 1, wherein said inner cover layer comprises from 1 to 100 phr of a heavy weight filler material.

6. The multi-layer golf ball of claim 1, wherein said inner cover layer comprises from 4 to 51 phr of a heavy weight filler material.

7. The multi-layer golf ball of claim 1, wherein said heavy weight filler material is a powdered metal selected from the group consisting of powdered brass, tungsten, titanium, bismuth, boron, bronze, cobalt, copper, inconnel metal, iron, molybdenum, nickel, stainless steel, zirconium oxide, and aluminum.

8. The multi-layer golf ball of claim 1, wherein said heavy filler material is powdered bronze.

9. The multi-layer golf ball of claim 1, wherein said inner cover layer has a Shore D hardness of 65 or more and is comprised of a blend of ionomer resins.

10. The multi-layer golf ball of claim 9, wherein said blend of ionomer resins includes a blend of a zinc cation neutralized ionomeric resin and a sodium cation neutralized ionomeric resin.

11. The multi-layer golf ball of claim 9, wherein said blend of ionomer resins includes a blend of a magnesium cation neutralized ionomeric resin and a sodium cation neutralized ionomeric resin.

12. The golf ball of claim 1 wherein said blend of polybutadiene rubbers comprises a first polybutadiene having a Mooney viscosity of about 40 and a second polybutadiene having a Mooney viscosity of about 60.

13. A golf ball comprising:
   a core including (i) a first polybutadiene rubber obtained utilizing a cobalt catalyst and having a Mooney viscosity in the range of from about 70 to about 83, and (ii) a blend of polybutadiene rubbers wherein each is obtained by utilizing a lanthanide series catalyst wherein said blend of polybutadiene rubbers comprises a first polybutadiene having a Mooney viscosity of about 40 and a second polybutadiene having a Mooney viscosity of about 60;

a cover disposed about said core, said cover comprising an inner cover layer and an outer cover layer, wherein said inner cover layer is comprised of at least one ionomer resin having an acid content of 16 weight percent or more, said inner cover layer further comprising a heavy weight filler.

14. The multi-layer golf ball of claim 13, where said inner cover layer is comprised of at least one ionomer resin having an acid content of 18 weight percent or more.

15. The multi-layer golf ball of claim 13, wherein said inner cover layer comprises from 1 to 100 phr of a heavy weight filler material.

16. The multi-layer golf ball of claim 13, wherein said inner cover layer comprises from 4 to 51 phr of a heavy weight filler material.

17. The multi-layer golf ball of claim 13, wherein said heavy weight filler material is a powdered metal selected from the group consisting of powdered brass, tungsten, titanium, bismuth, boron, bronze, cobalt, copper, inconnel metal, iron, molybdenum, nickel, stainless steel, zirconium oxide, and aluminum.

18. The multi-layer golf ball of claim 13, wherein said heavy filler material is powdered bronze.

19. The multi-layer golf ball of claim 11, wherein said inner cover layer has a Shore D hardness greater than that of the outer cover.

20. A golf ball comprising:
a core including (i) a first polybutadiene rubber obtained utilizing a cobalt catalyst and having a Mooney viscosity in the range of from about 70 to about 83, and (ii) a blend of polybutadiene rubbers wherein each is obtained by utilizing a lanthanide series catalyst wherein said blend of polybutadiene rubbers comprises a first polybutadiene having a Mooney viscosity of about 40 and a second polybutadiene having a Mooney viscosity of about 60;

a cover disposed about said core, said cover comprising an inner cover layer and an outer cover layer wherein said inner cover layer is harder than said outer cover layer, further wherein said inner cover layer is comprised of at least one ionomer resin having an acid content of 16 weight percent or more, said inner cover layer further comprising a bronze powder heavy weight filler and said outer cover layer is comprised of a blend of low acid ionomer resins.

* * * * *